United States Patent [19]

Uchida et al.

[11] Patent Number: 5,679,298
[45] Date of Patent: *Oct. 21, 1997

[54] METHOD OF PRODUCING PATTERNED SHAPED ARTICLE USING SCRAPER

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[*] Notice: The term of this patent shall not extend beyond the expiration date of Pat. No. 5,

[21] Appl. No.: 501,048

[22] PCT Filed: Dec. 21, 1994

[86] PCT No.: PCT/JP94/02168

§ 371 Date: Aug. 18, 1995

§ 102(e) Date: Aug. 18, 1995

[87] PCT Pub. No.: WO95/17311

PCT Pub. Date: Jun. 29, 1995

[30] Foreign Application Priority Data

Dec. 21, 1993 [JP] Japan ................... 5-344765

[51] Int. Cl.⁶ .................................... B29C 67/02
[52] U.S. Cl. .............. 264/101; 264/112; 264/122; 264/138; 264/139; 264/239; 264/241; 264/344
[58] Field of Search .............. 264/60, 101, 112, 264/113, 115, 119, 122, 138, 139, 239, 241, 344

[56] References Cited

U.S. PATENT DOCUMENTS

| | | | |
|---|---|---|---|
| 1,583,516 | 5/1926 | Anfield | 264/138 X |
| 1,605,197 | 11/1926 | Anfield | 264/138 X |
| 1,657,784 | 1/1928 | Bergstrom | 51/295 |
| 2,042,964 | 6/1936 | Rinehart | 264/122 X |
| 4,244,993 | 1/1981 | Platka, III et al. | 428/15 |
| 4,803,034 | 2/1989 | Moret | 264/504 |
| 5,047,187 | 9/1991 | Banus | 264/71 |
| 5,173,233 | 12/1992 | Kafarowski | 264/113 |
| 5,209,949 | 5/1993 | Osada | 427/198 |
| 5,246,650 | 9/1993 | Clark | 264/87 |
| 5,368,791 | 11/1994 | Uchida et al. | 264/35 |
| 5,376,321 | 12/1994 | Uchida et al. | 264/60 |
| 5,429,676 | 7/1995 | Uchida et al. | 118/310 |
| 5,445,772 | 8/1995 | Uchia et al. | 264/32 |
| 5,540,871 | 7/1996 | Uchida et al. | 264/113 |

FOREIGN PATENT DOCUMENTS

| | | |
|---|---|---|
| 61-124547 | 6/1986 | Japan . |
| 63-78049 | 5/1988 | Japan . |

*Primary Examiner*—Donald E. Czaja
*Assistant Examiner*—Sean Vincent
*Attorney, Agent, or Firm*—Oblon, Spivak, McClelland, Maier & Neustadt, P.C.

[57] ABSTRACT

Disclosed is a shaped article made from concrete, artificial stone, ceramic, metal, plastic, etc. and having a minute and beautiful pattern expressed on part or all of the surface thereof by a pattern course of a prescribed thickness. This shaped article is produced by forming at least two superposed courses of different dry particles on a base surface, moving a scraper located at a prescribed position above the base surface in accordance with a pattern to be expressed so as to scrape at least the lowermost course, allowing the dry particles of the upper course to cave into a cavity thus formed, thereby expressing the pattern on the bottom surface of the lowermost course, and allowing all the particles to set into an integral mass, either as they are or after the top surface of the uppermost course is made even or overlaid with a backing course.

6 Claims, 22 Drawing Sheets

FIG. 31
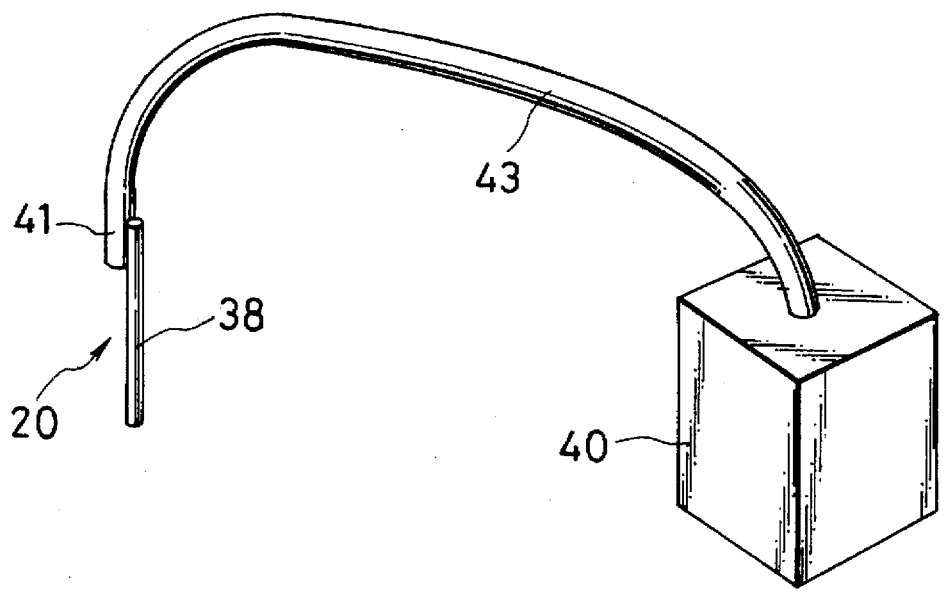
FIG. 32(a)
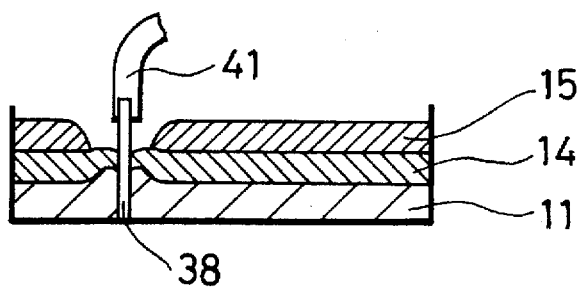
FIG. 32(b)
FIG. 33(a)
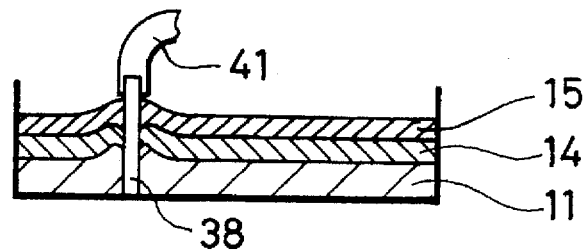
FIG. 33(b)
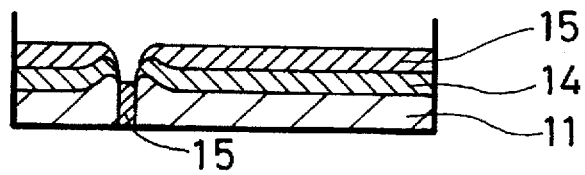

50

50

50

50

20

20

20

20

METHOD OF PRODUCING PATTERNED SHAPED ARTICLE USING SCRAPER

BACKGROUND OF THE INVENTION

1. Field of the Invention

This invention relates to a method for producing patterned concrete shaped articles, patterned artificial stone shaped articles, patterned raw products for sintering into ceramic shaped articles, patterned ceramic shaped articles, patterned metal shaped articles, patterned impasto shaped articles, patterned plastic shaped articles, patterned shaped foodstuffs and other such patterned shaped articles, using a scraper.

2. Discussion of the Related Art

Up to now the only way available for providing a part of a surface, such as of paving blocks, with a pattern indicating a pedestrian crossing, a stop sign or other such traffic sign or for providing the entire surface of the blocks with a pattern has been to paint the surface with a coating material such as paint or to inlay the desired pattern.

Since the patterns painted on a part or all of the surface of paving blocks are exposed to abrasion such as from the footwear of pedestrians walking on the blocks, and the tires of vehicles driving over them, they quickly wear off and have to be redone at frequent intervals. The amount of labor involved in this work is considerable. Where the pattern is formed by inlaying, the work itself is troublesome and very costly.

The present inventors previously proposed methods for readily producing various types of patterned shaped articles which do not lose their surface patterns and do not become unsightly even when exposed to surface abrasion, using at least one means for holding the material selected from among an auxiliary form corresponding to the pattern to be expressed (in Japanese Patent Application KOKAI Nos. 4-105903, 5-38707, 5-38708 and 5-238767), a cell form consisting of cylindrical cell bodies of a set height arranged in a contiguous manner (in Japanese Patent Application KOKAI Nos. 4-140104, 4-139083, 5-847157 and 5-84714), and a bristling form consisting of densely bristling projections (in Japanese Patent Application KOKAI Nos. 4-345803, 5-324068, 5-237816 and 5-237821).

The present inventors further proposed a method for producing a patterned shaped article comprising the steps of forming a dry particle course on a base surface, moving a scraper located at a prescribed position above the base surface in accordance with a pattern to be expressed, thereby scraping the dry particle course, charging a cavity thus formed with a different type of dry particles, and allowing the particles to set into an integral mass (Japanese Patent Application No. 5-229642 and International Patent Application No. PCT/JP94/01397).

The object of this invention is to provide a method of rapidly producing with ease shaped articles precisely expressing various patterns such as patterns of lines of various thicknesses.

SUMMARY OF THE INVENTION

The present invention provides a method of producing a patterned shaped article comprising the steps of forming at least two superposed courses of different dry particles on a base surface, moving a scraper located at a prescribed position above the base surface in accordance with a pattern to be expressed so as to scrape at least the lowermost course, allowing the dry particles of the upper course to cave into a cavity thus formed, thereby expressing the pattern on the bottom surface of the lowermost course, and allowing all the particles to set into an integral mass, either as they are or after the top surface of the uppermost course is made even or overlaid with a backing course.

The present invention also provides a method of producing a patterned shaped article comprising the steps of forming at least two superposed courses of different dry particles on a base surface, moving a scraper located at a prescribed position above the base surface in accordance with a pattern to be expressed so as to scrape at least the lowermost course while at the same time removing the particles of at least the lowermost course by suction, allowing the dry particles of the upper course to cave into a cavity thus formed, thereby expressing the pattern on the bottom surface of the lowermost course, and allowing all the particles to set into an integral mass, either as they are or after the top surface of the uppermost course is made even or overlaid with a backing course.

Thus, since the present invention produces a shaped article by forming at least two superposed courses of different dry particles on a base surface, moving a scraper in accordance with a pattern to be expressed so as to scrape at least the lowermost course of the superposed courses, allowing the dry particles of the upper course to cave into a cavity thus formed, thereby expressing the pattern on the bottom surface of the lowermost course, and allowing all the particles to set into an integral mass, line patterns of a desired thickness can be formed. Further, since the material for a pattern is placed in advance on the base surface in the form of a layer, a material charging operation can be omitted, thereby attaining high productivity.

BRIEF DESCRIPTION OF THE DRAWINGS

FIG. 31 is a perspective view showing a third example of the scraper with suction port, used in the method of the present invention.

FIG. 32(a) is a cross section showing a cavity formed by the scraper with suction port of FIG. 31.

FIG. 32(b) is a cross section showing the particles of the intermediate course having caved into the cavity of FIG. 32(a).

FIG. 33(a) is a cross section showing a cavity formed by the scraper with suction port of FIG. 31.

FIG. 33(b) is a cross section showing the particles of the upper course having caved into the cavity of FIG. 33(a).

DESCRIPTION OF THE PREFERRED EMBODIMENTS

Figure 1:
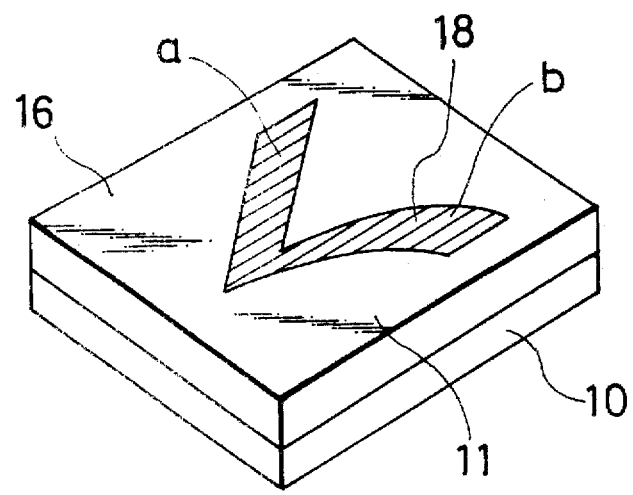
FIG. 1 is a perspective view showing a first example of the shaped article produced by the method of the present invention.
Figure 5A:
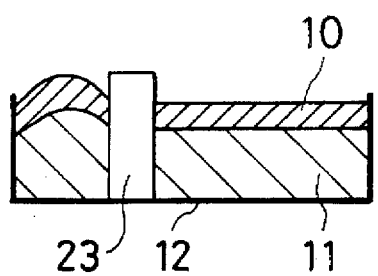
FIG. 5(a) is a cross section showing a cavity formed by the method of FIG. 3 using the scraper of FIG. 2(b).
Figure 5B:
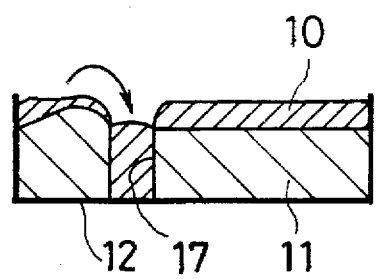
FIG. 5(b) is a cross section showing particles of an upper course having caved into the cavity of FIG. 5(a).
Figure 6:
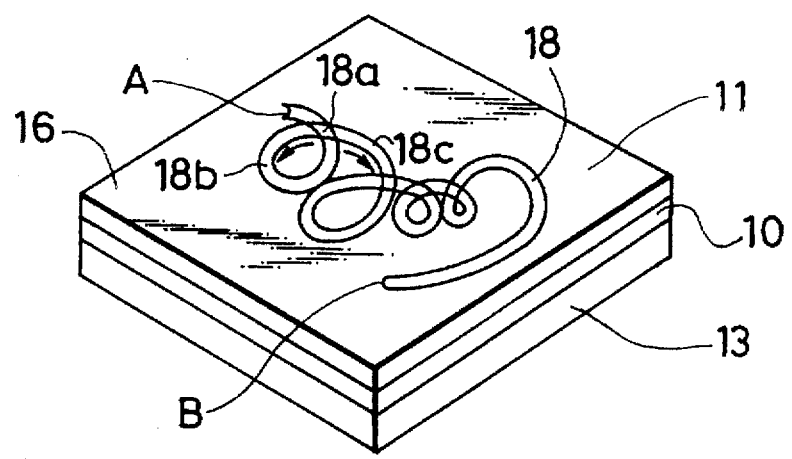
FIG. 6 is a perspective view showing a second example of the shaped article produced by the method of the present invention.
Figure 11A:
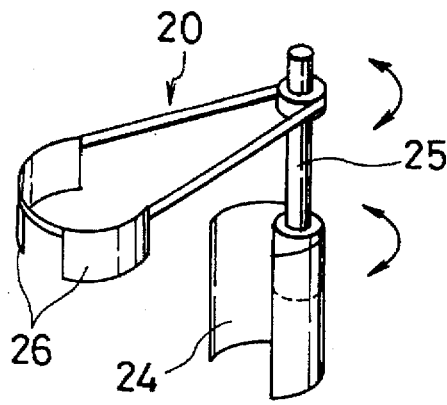
FIG. 11(a) is a perspective view showing a fifth example of the scraper used in the method of the present invention.
Figure 11B:
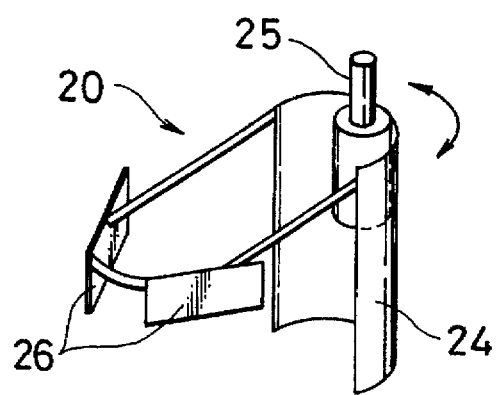
FIG. 11(b) is a perspective view showing a sixth example of the scraper.
Figure 12:
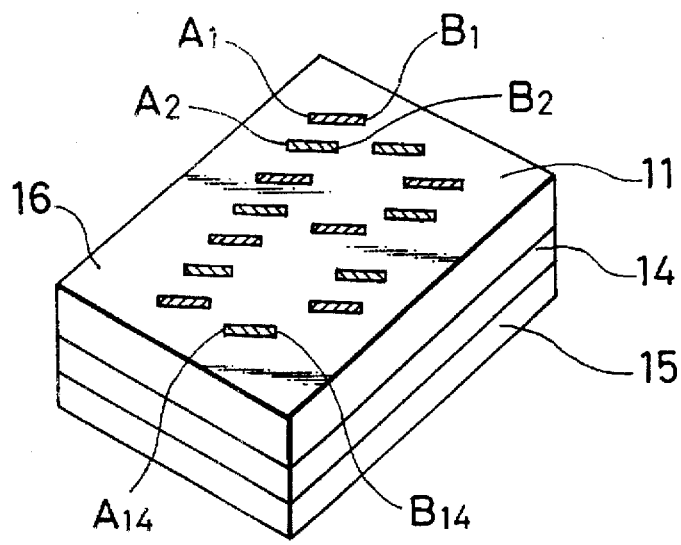
FIG. 12 is a perspective view showing a third example of the shaped article produced by the method of the present invention.
Figure 20A:
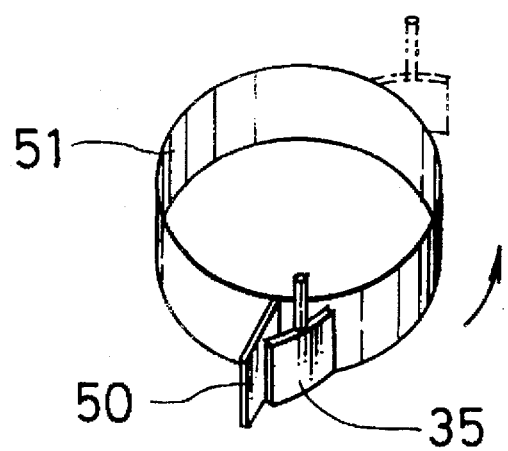
FIG. 20(a) is a perspective view showing an auxiliary guide member for expressing the pattern of the shaped article of FIG. 17.
Figure 20B:
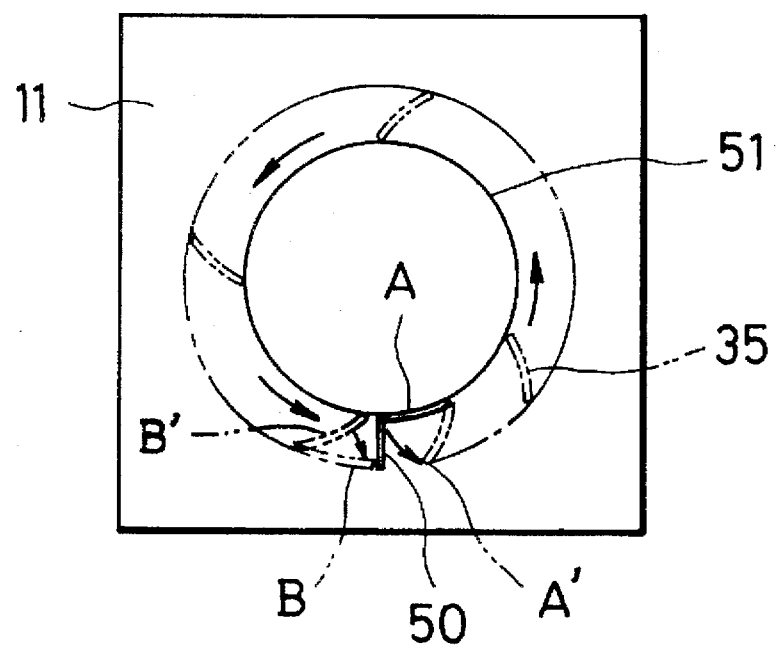
FIG. 20(b) is an explanatory view showing how to express a pattern using the auxiliary guide member of FIG. 20(a).
Figure 21:
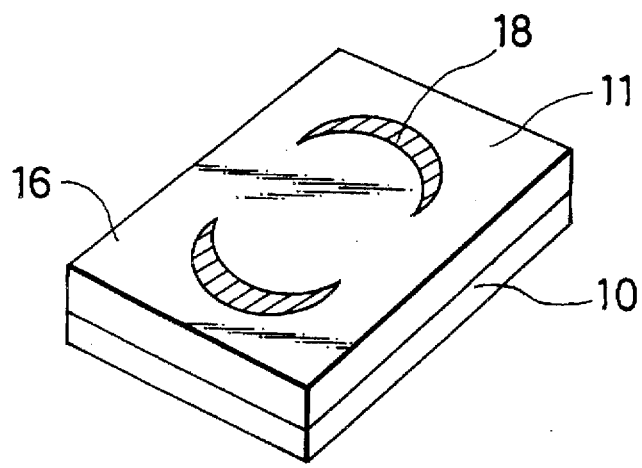
FIG. 21 is a perspective view showing a fifth example of the shaped article produced by the method of the present invention.
Figure 22:
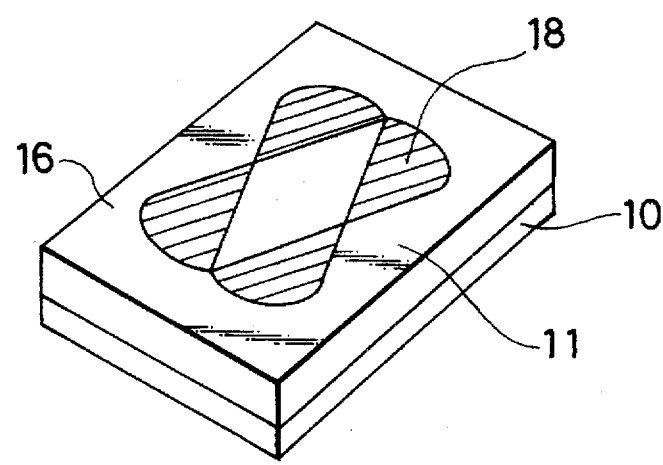
FIG. 22 is a perspective view showing a sixth example of the shaped article produced by the method of the present invention.
Figure 23:
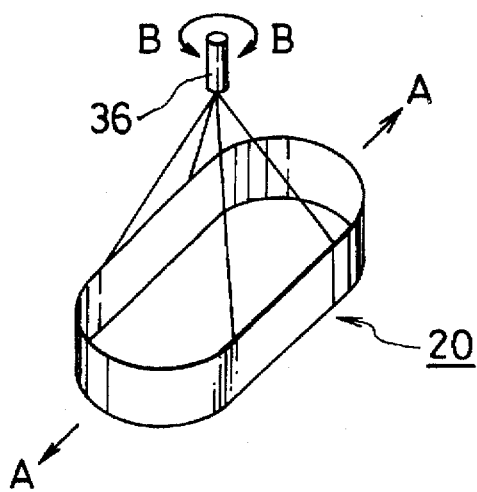
FIG. 23 is a perspective view showing a thirteenth example of the scraper for expressing a pattern on the shaped article of FIG. 21 or FIG. 22.
Figure 24:
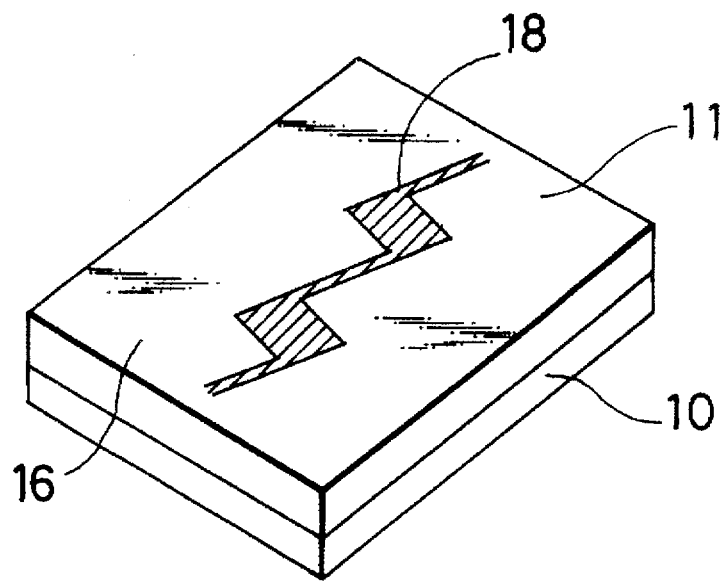
FIG. 24 is a perspective view showing a seventh example of the shaped article produced by the method of the present invention.

While for convenience the following description will be limited to the examples shown in FIGS. 1 to 51, the present invention is capable of expressing a variety of patterns by varying the shape and movement of the scraper. FIG. 1 shows an example of a shaped article having an arrow pattern, FIG. 6 shows an example of a shaped article with a one-stroke pattern, FIG. 12 shows an example of a shaped article patterned with the letter B expressed in dots, FIG. 17 shows an example of a shaped article patterned with a circle, FIGS. 21 and 22 show examples of shaped articles with ellipsoid patterns, and FIG. 24 shows an example of a shaped article patterned with a lightning pattern.

Although the particles used to form a lower particle course on a base surface and those used to form an upper particle course on the lower particle course are dry, they may have absorbed one or more of water, oil, lubricant-bonding agent, solvent, setting agent and plasticizer insofar as they are not kneaded with any one of water, oil, lubricant-bonding agent, solvent, setting agent and plasticizer, but are amenable to pulverization before charging.

Figure 2A:
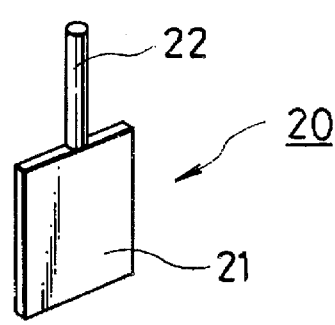
FIG. 2(a) is a perspective view showing a first example of the scraper used in the method of the present invention.
Figure 2B:
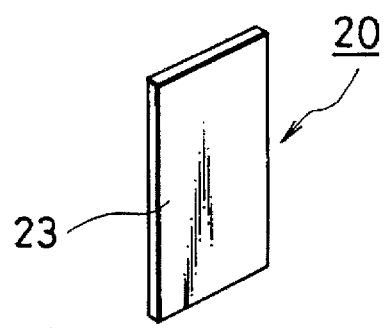
FIG. 2(b) is a perspective view showing a second example of the scraper.
Figure 3:
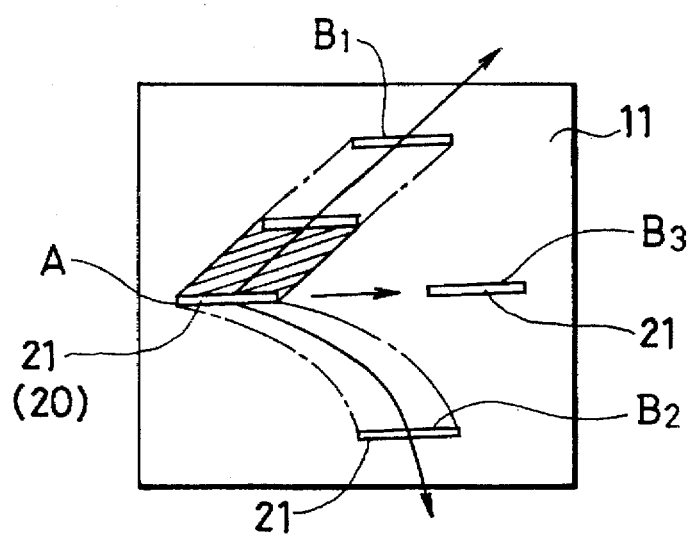
FIG. 3 is a plan view showing how to move a scraper for producing the shaped article of FIG. 1.
Figure 4A:
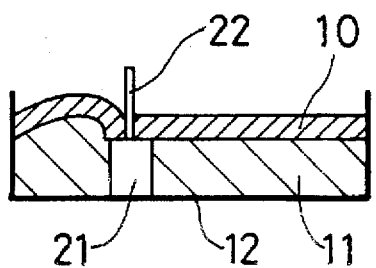
FIG. 4(a) is a cross section showing a cavity formed by the method of FIG. 3 using the scraper of FIG. 2(a).
Figure 4B:
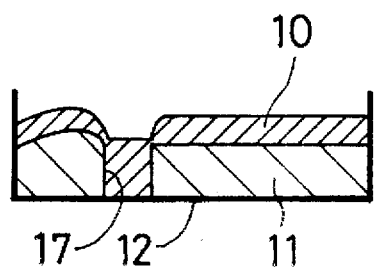
FIG. 4(b) is a cross section showing particles of an upper course having caved into the cavity of FIG. 4(a).

FIG. 1 shows a shaped article 16 comprising two courses of different particles, the lower course 11 being shown as the upper surface in this Figure and having an arrow pattern 18 formed of the particles of the upper course 10. One side of the arrow is expressed by a thick line a of unchanging width, and the other side by a line b that changes from a thin line to a thick line. This shaped article can be produced by a first method of the invention which comprises using a scraper 20 of FIG. 2(a) having a slender rod 22 attached to a thin scraper plate 21 to scrape with the scraper plate 21 the particles of the lower course 11 of the superposed courses in contact with a base surface while causing the slender rod 22 not to scrape but to move in conjunction with the scraper plate 21 in the particles of the upper course 10, thereby consequently forming a cavity, and causing the particles of the upper course 10 to cave into the cavity, thereby expressing a pattern. This will be described in more detail with reference to FIGS. 3 and 4. A lower course 11 of dry particles is first formed on a base surface 12 and an upper course 10 of different particles from the lower course is then formed on the lower course to obtain two courses. The scraper 20 is pushed down into the lower course at point "A" of FIG. 3 until the lower edge thereof reaches the base surface 12. At this time, the upper end of the scraper plate 21 reaches at a position slightly higher than the upper surface of the lower course and the slender rod 22 pierces through and projects from the upper surface of the upper course 10. The scraper is then moved up in a straight line at an angle of 45 degrees toward $B_1$. Since the surface of the scraper plate 21 obliques, the right edge thereof cuts the particles of the lower course 11 vertically ahead of the left edge thereof during the movement of the scraper. As shown in FIG. 4(a), consequently, the surface of the scraper plate pushes the particles of the scraped lower course up into a ridge on the left side of the scraper with the upper course 10 superposed on the ridge as it leaves a cavity formed in its wake at a position backward of the direction of advance. This cavity 17 is then filled with the particles of the upper course 10 not scraped, right down to the base surface 12, owing to their cave-in action as shown in FIG. 4(b), to thereby form a pattern. The scraper 20 is then reinserted at point A of FIG. 3 and moved down in a curving movement at an angle of 45 degrees toward $B_2$. During this movement, the angle of the scraper relative to the direction of advance is gradually increased from the parallel. This scrapes the particles of the lower course in one direction with the scraper plate as described above and forms in the lower course a cavity that is narrow near point "A" and broadens as it approaches $B_2$. The particles of the upper course are allowed to cave into the cavity to express a pattern of FIG. 1 on the lower surface of the lower course. The particles are then allowed to set into an integral mass either as they are or after being smoothened (inclusive of the case where the concaves of the upper course are filled with particles same in kind as those of the upper course) and, when necessary, overlaid with a backing course. In the embodiment of FIG. 3, the scraper 20 comprising the thin scraper plate 21 and the slender rod is used and the angle of the scraper plate relative to the direction of advance is changed to change the line thickness. However, the expression of the line width is not limited to this embodiment, and various line widths can be expressed by varying the shape and material of the scraper and by varying the angle of contact between the scraper and the base surface. Although for simplicity the explanation refers to the scraper being reinserted at point A and moved toward $B_2$, the scraper can instead be moved from $B_1$ to A to $B_2$, for example. It is possible to utilize the fact that nothing is expressed if the thin scraper plate is moved without setting it at an angle relative to the direction of advance in moving the scraper to a prescribed position. Since the scraper is a thin plate, it can be moved, for example, from point A to point $B_3$ without scraping the particles and producing any expression. When a thin scraper 23 having a height greater than the total thickness of the two particle courses, as shown in FIG. 2(b), is used for operation in the same manner as described above, a cavity is formed while the particles of the lower and upper courses 11 and 10 are plowed up in one direction to form a ridge as shown in FIG. 5(a). By applying vibration to the scraper or scraping up the upper course with a suitable means, the particles of the upper course are caused to cave into the cavity, thereby expressing a pattern (FIG. 5 (b)). Thus, the line width can be changed by changing the shape and material of the scraper, the angle of contact between the base surface and the scraper, etc. In case where both the lower course 11 and the upper courses 10 are scraped, the particles of the upper course are allowed to cave into and fill the cavity by applying vibration to the scraper or scraping up the upper course with a suitable means. In this case, therefore, it is efficient to apply vibration to the scraper or provide an auxiliary scraping-up member in the vicinity of or directly on the scraper.

The height of the portion of a scraper used to scrape the particles can be either equal to or slightly larger than the thickness of the lower course 11. Where a scraper having a slender rod is used to scrape the lower course without scraping the upper course, it is preferable for the portion of the scraper used to scrape the lower course to be slightly taller than the thickness of the lower course because this can express a pattern neatly. While the total height of the scraper with or without a slender rod can be either equal to or greater than the total thickness of the upper and lower courses, for ease of handling it is preferable for the scraper to be slightly taller than the total thickness. The meaning of scrape used herein encompasses raking, plowing, digging and the like.

Figure 7A:
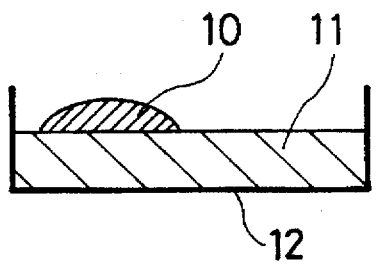
FIG. 7(a) is a cross section showing an upper course formed on a partial surface of a lower course.
Figure 7B:
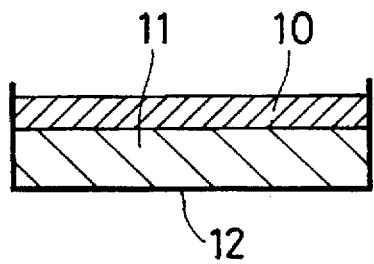
FIG. 7(b) is a cross section showing an upper course formed on the entire surface of a lower course.
Figure 8A:
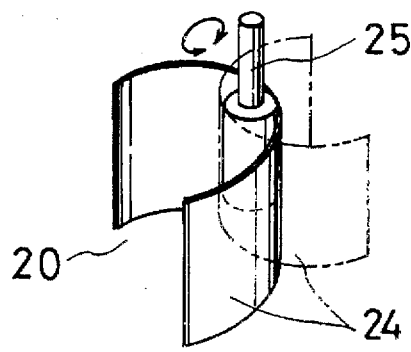
FIG. 8(a) is a perspective view showing a third example of the scraper used in the method of the present invention.
Figure 8B:
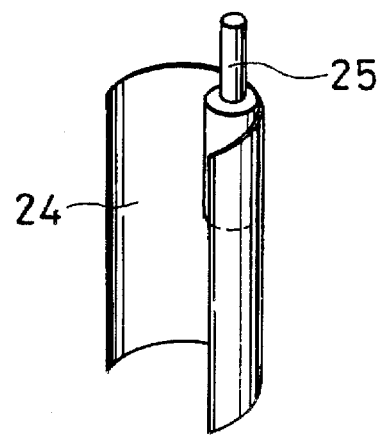
FIG. 8(b) is a perspective view showing a fourth example of the scraper.
Figure 9A:
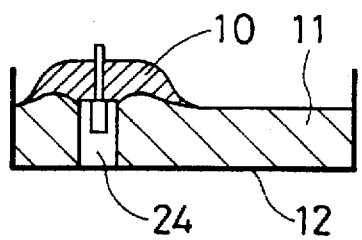
FIG. 9(a) is a cross section showing a cavity formed by the method of FIG. 6 using the scraper of FIG. 8(a).
Figure 9B:
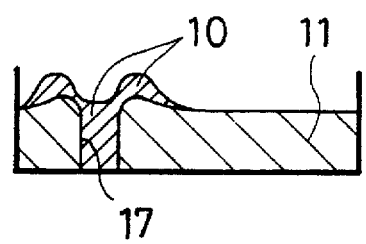
FIG. 9(b) is a cross section showing the particles of the upper course having caved into the cavity of FIG. 9(a).
Figure 10A:
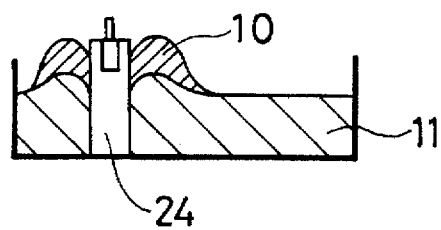
FIG. 10(a) is a cross section showing a cavity formed by the method of FIG. 6 using the scraper of FIG. 8(b).
Figure 10B:
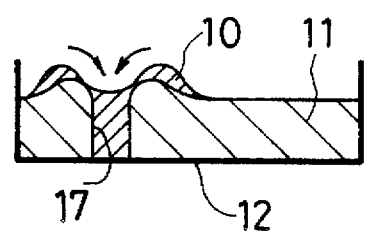
FIG. 10(b) is a cross section showing the particles of the upper course having caved into the cavity of FIG. 10(a).

FIG. 6 shows a shaped article 16 on which there is formed a pattern 18 consisting of a single stroke of uniform width and whose rear side is overlaid with a backing course 13. This shaped article is formed in accordance with the method of the first invention, using a scraper 20 of FIG. 8(a) comprising a U-shaped scraper plate 24 rotatably affixed to a shaft 25. A dry particle lower course 11 is formed on a base surface 12 and, on a portion of the lower course to be patterned, an upper layer 10 of a different kind of particles is formed to obtain a partially duplicate layer composite (FIG. 7(a)). The U-shaped scraper plate 24 is then inserted into the duplicate portion at point "A" in FIG. 6 until the lower edge of the plate 24 contacts the base surface 12. At this time, the shaft 25 projects upward from the upper course 10. When the scraper is moved along a pattern to be formed, with the concave portion of the U-shaped scraper plate directed forward, the U-shaped scraper plate 24 advances while rotating about the shaft to scrape the particles of the lower course alone and, as shown in FIG. 9(a), form ridges on each side and the particles of the upper course are placed on the formed ridges. By the movement of the scraper, a cavity is formed in the wake of the scraper and, as shown in FIG. 9(b), the particles of the upper course remaining without being scraped are allowed to cave into the cavity. As a result, a linear pattern of uniform width shown in FIG. 6 is formed on the bottom surface of the lower course. The particles are then allowed to set into an integral mass, either as they are or after being smoothed at the upper surface and/or overlaid with a backing course 13, if required. When a scraper having a U-shaped scraper plate of a height greater than the total thickness of the upper and lower courses, as shown in FIG. 8(b), is used for operation in the same manner as described above, the U-shaped scraper plate scrapes the particles of the upper and lower courses to form ridges on each side and a cavity 17 as shown in FIG. 10(a). By applying vibration to the scraper or scraping up the upper course with a suitable means, the particles of the upper course are caused to cave into the cavity 17 (FIG. 10(b)), thus forming the same stroke of pattern on the bottom surface of the lower course 11. In any case shown in FIG. 9, FIG. 10, etc., a scraper 20 integral with a scraping-up member 26 rotatable in the same manner as the U-shaped scraper plate as shown in FIG. 11(a) or FIG. 11(b) can be used. When this scraper is used for the superposed lower and upper courses 11 and 10 shown in FIG. 7(b), for example, it is very convenient because the scraping-up member scrapes up the particles of the courses in an amount corresponding to the amount of the particles scraped and causes the particles to cave into cavities, thereby making it possible to continuously scrape, scrape up and raked up the particles.

When the amount of particles to be scraped is large and it is necessary to re-scrape the already scraped portion in the case of expressing a pattern having intersecting points, a clear-cut pattern can be expressed by moving the scraper from a point which will become an intersecting point toward the forward and backward directions, e.g. from a point 18a to points 18b and 18c as shown in FIG. 6, whereafter a line drawn by the movement of the scraper in the opposite direction is connected with the already drawn line at each of the points 18b and 18c. Further, it is advantageous if end stops as shown in FIG. 41 are inserted at points of intersection to be formed after scraping so as to support the intersecting portions while the remaining portions are scraped.

In this example, the width of the lines formed is constant. However, this is by no means limitative. Various line widths can be obtained by varying the shape and material of the scraper, the angle of contact of the scraper relative to the base surface, etc.

Figure 13A:
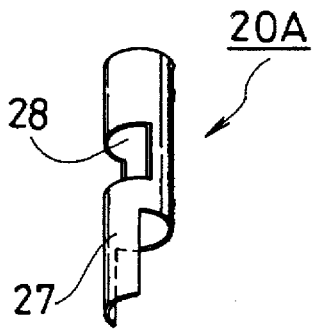
FIG. 13(a) is a perspective view showing a seventh example of the scraper used in the method of the present invention.
Figure 13B:
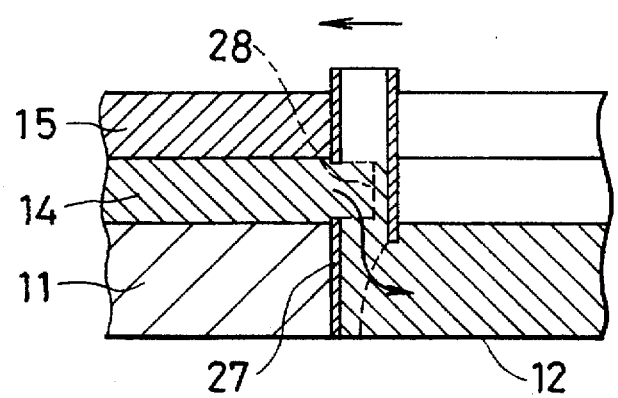
FIG. 13(b) is a cross section showing how to move the scraper of FIG. 13(a).
Figure 14A:
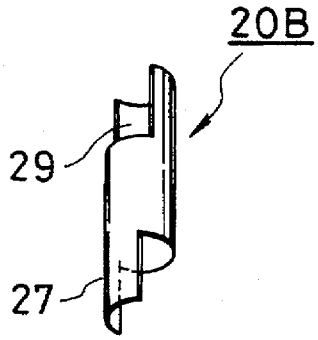
FIG. 14(a) is a perspective view showing an eighth example of the scraper used in the method of the present invention.

The shaped article shown in FIG. 12 comprises a white course, a red course and a blue course overlapped in the order mentioned, with a pattern of the letter "B" expressed on the white course in the form of dots which are constituted of the particles of the red and blue courses in alternate arrangement. This shaped article is formed by the method of the first invention using scrapers shown in FIG. 13(a) and FIG. 14(a) to scrape the particles of a lower white course 11 after the lower white course, an intermediate red course 14 and an upper blue course 15 are formed successively on the base surface 12. The scrapers 20A and 20B shown in FIG. 13(a) and FIG. 14(a) are both cylindrical and each have a semicylindrical scraping surface 27 at a portion thereof moving within the lower white course 11 while the tip thereof abuts against the base surface. The back of the portion opens. The scraper 20A shown in FIG. 13(a) has a notch 28 formed on the same side as that of the scraping surface 27 at a portion thereof moving within the intermediate red course 14 and has a portion formed above the notch 28 for scraping the upper blue course. With this structure, therefore, by bringing the tip of the scraper into abutment on the base surface and moving the scraper within the overlapped courses with the scraping surface 27 faced in the advancing direction, particles of the lower white course 11 and those of the upper blue course 15 are scraped to the opposite sides to form cavities and, at the same time, the red particles of the intermediate course flowing into the cylinder from the notch 28 enter via the opening back of the scraping surface 27 into the cavity formed in the lower white course 11, as shown in FIG. 13(b), thereby forming a red line pattern on the bottom of the lower white course.

Figure 14B:
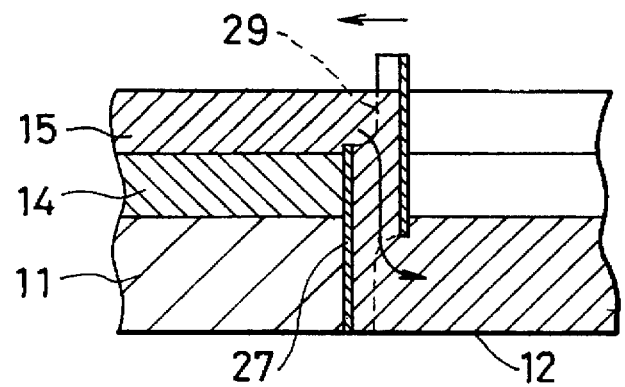
FIG. 14(b) is a cross section showing how to move the scraper of FIG. 14(a).

The scraper 20B shown in FIG. 14(a) has a scraping surface 27 at a portion moving within the upper blue course 15, a notch 29 formed on the same side as that of the scraping surface, and a portion formed between the scraping surface 27 and the notch 29 for scraping the intermediate red course 14. With this structure, therefore, by bringing the tip of the scraper into abutment on the base surface 12 and moving the scraper within the overlapped courses with the scraping surface 27 faced in the advancing direction, the particles of the lower white course 11 and those of the intermediate red course 14 are scraped to the opposite sides to form cavities and, at the same time, the particles of the lower blue course flowing into the cylinder from the notch 29 enter via the back opening of the scraping surface 27 into the cavity formed in the lower white course 11, as shown in FIG. 14(b), thereby forming a blue line pattern on the bottom of the lower course. In the shaped article shown in FIG. 12, the scraper 20A shown in FIG. 13(a) is first inserted at point A1 and moved toward point B1 to form a red dot-like line pattern and the scraper 20B shown in FIG. 14(a) is then inserted at point A2 and moved toward point B2 to form a blue dot-like line pattern. In this way, red and blue dot-like line patterns are alternately formed from A3–B3 to A14–B14, thereby expressing a pattern of the letter "B" as a whole. Upon completion of this expression, the courses are set into an integral mass as they are or after the upper course 15 is made even and/or overlaid with a backing course when necessary. It is noted that portions for retaining the scrapers have been omitted from FIG. 13(a) and FIG. 14(a).

Figure 15A:
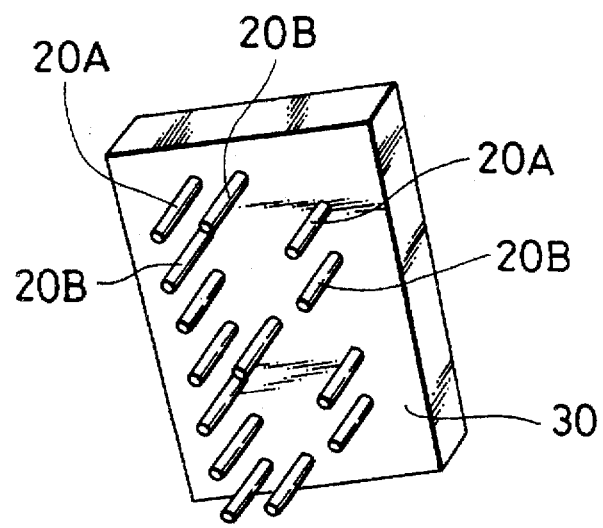
FIG. 15(a) is a perspective view showing a ninth example of the scraper used in the method of the present invention.
Figure 15B:
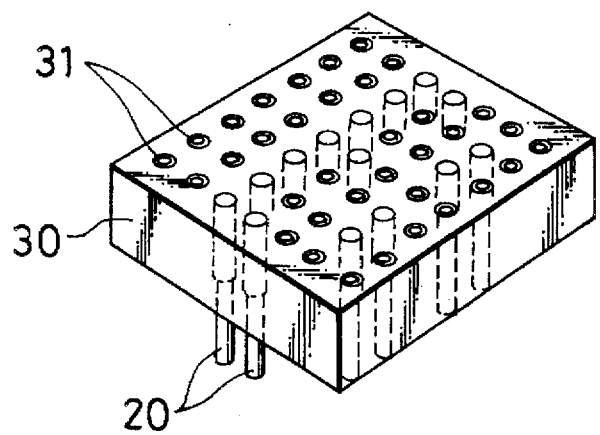
FIG. 15(b) is a perspective view showing a tenth example of the scraper.
Figure 15C:
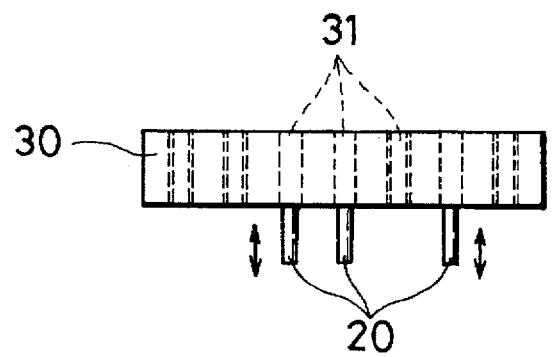
FIG. 15(c) is a side view showing the scraper of FIG. 5(b).

In the example of FIG. 12, the dots are expressed by linearly moving the cylindrical scrapers 20A and 20B. This is by no means limitative. For example, dots may be expressed by moving the scrapers to have a large amplitude, describe a circle or describe a spiral from a center point. In any of these cases, the size of the dots will be determined by the amount of the scraper moved. Alternatively, a member comprising a support body 30 and a plurality of integral scrapers 20A and 20B forming the letter "B" as a whole as shown in FIG. 15(a) can be used instead. In this case, a pattern of the letter "B" can be expressed at a time and, when the member is vibrated, the cavities formed in the lower course can be filled with the red and blue particles of the intermediate and upper courses at a time due to their cave-in action. In the example shown in FIG. 15(b) and FIG. 15(c), a support body 30 has 7×7 scrapers 20 arranged in dot-like form and upper holders 31 arranged in the same manner as the scrapers for pulling up and storing the scrapers unnecessary to use. In this way, a necessary number of scrapers are used to form a pattern while unnecessary scrapers are caused to leap up or pulled up into the upper holders.

Figure 16A:
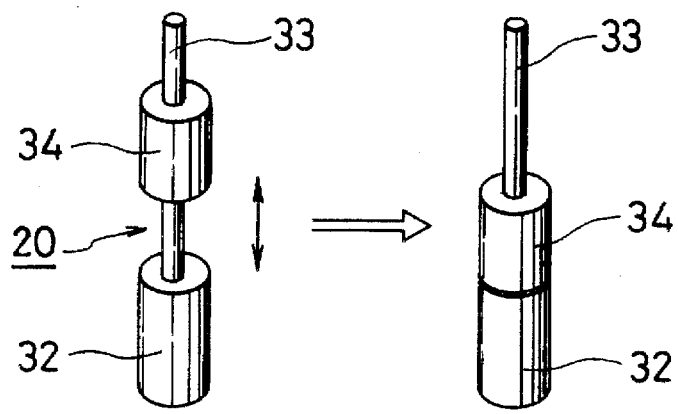
FIG. 16(a) is a perspective view showing an eleventh example of the scraper used in the method of the present invention.
Figure 16B:
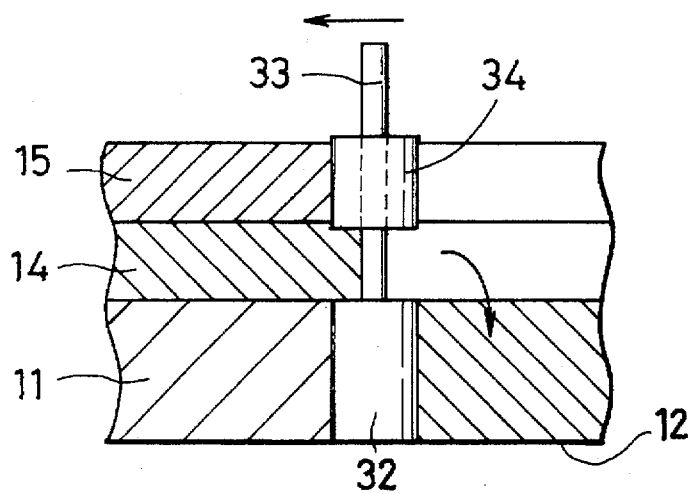
FIG. 16(b) is a cross section showing a first example of how to move the scraper of FIG. 16(a).
Figure 16C:
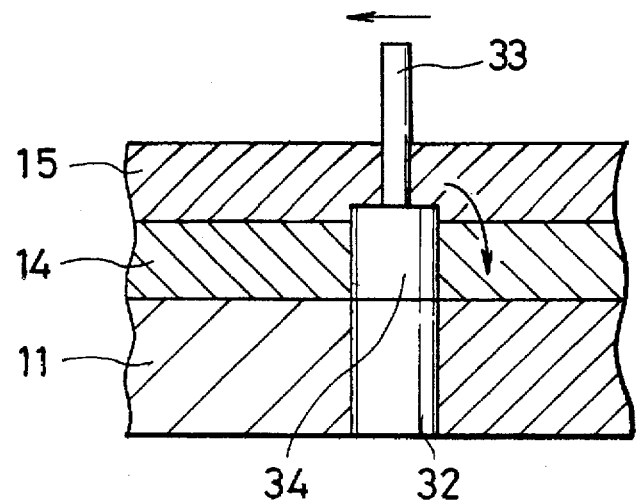
FIG. 16(c) is a cross section showing a second example of how to move the scraper of FIG. 16(a).
Figure 17:
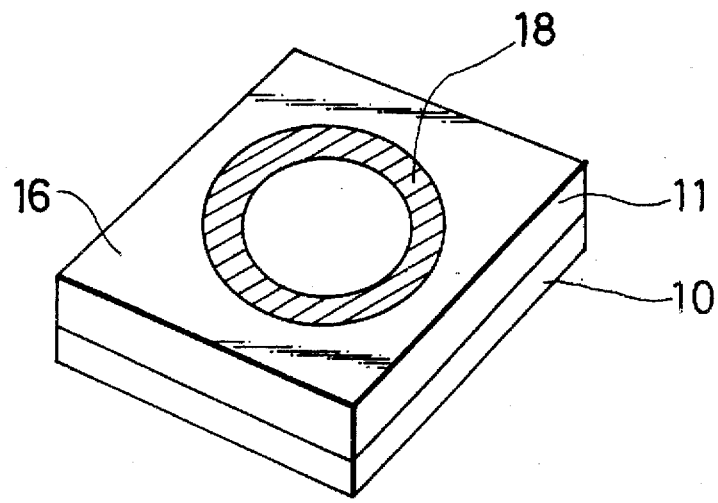
FIG. 17 is a perspective view showing a fourth example of the shaped article produced by the method of the present invention.

FIG. 16(a) shows another example of the scraper comprising a lower portion 32 of a large width and a height corresponding to the thickness of the lower course 11, a slender support shaft 33 formed upright on the upper and of the lower portion, and a cylinder 34 vertically movably fitted on the support shaft. In use, while the cylinder 34 is kept at an upper position, the lower course 11 and upper course 10 are scraped by the lower portion 32 and cylinder 34, respectively, to form cavities and, at the same time, the red particles of the intermediate course 14 not scraped by the shaft 33 are allowed to cave into the cavity formed in the lower course (Refer to FIG. (16b).). While the cylinder 34 is kept supported on the lower portion 32, the lower course and intermediate course are scraped by the lower portion and cylinder, respectively, to form cavities and, at the same time, the blue particles of the upper blue course 15 are allowed to cave into the cavity formed in the lower white course 11 (Refer to FIG. 16(c).). In this way, it is possible to express red and blue line patterns on the bottom of the lower course.

Figure 18:
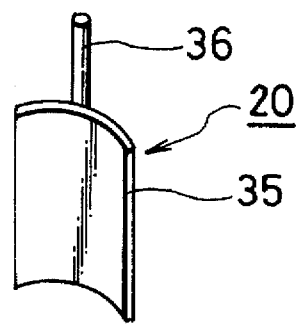
FIG. 18 is a perspective view showing a twelfth example of the scraper used in the method of the present invention.
Figure 19:
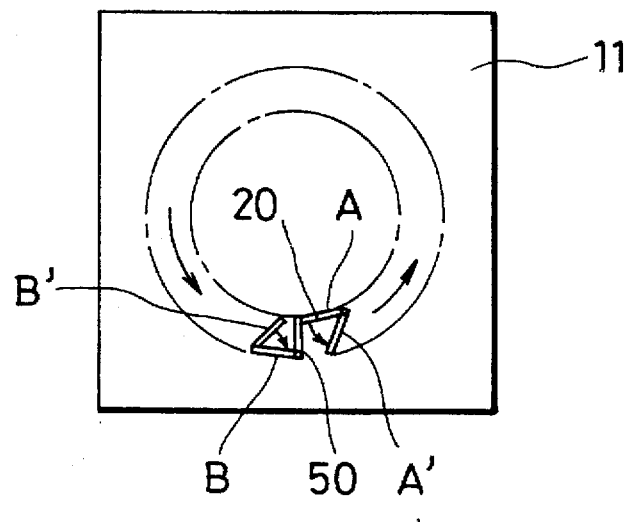
FIG. 19 is an explanatory view showing how to express a pattern of the shaped article of FIG. 17.

FIG. 17 shows a shaped article expressed with a doughnut-like ring pattern of a uniform width. This shaped article is formed by the method of the first invention using a scraper 20 having a thin scraper plate as shown in FIG. 2(a) or FIG. 2(b) or having an arcuately bent scraper plate 35 as shown in FIG. 18. On the bottom plate of a form which is regarded as the base surface 12 two courses of dry particles of different kinds are formed. The particles of the lower course are scraped arcuately in accordance with the method of FIG. 1. In order to neatly finish the connection between a start point and a terminal point, it is preferably to insert end stops 50 as shown in FIG. 41 into the particle course prior to the start of scraping. To be specific, as shown in FIG. 19, the scraper 20 is inserted at point A where one end of the scraper abuts on the end stop 50 and is rotated to point A' with the one end along the end stop, then scrapes the particles at a stroke to point B', and is rotated to point B with the one end along the end stop, thereby allowing the particles of the upper course to cave into the thus formed circular cavity. Another method comprises disposing an annular auxiliary guide 51 having an end stop 50 and a height substantially the same as or larger than the entire thickness of the courses before forming the courses or inserting the guide into the formed courses, using the scraper 20 having the curved scraper plate 35 with the same curvature as the guide 51 as shown in FIG. 18, inserting the scraper at point A so as to be along the guide within the lower course and so that one end thereof abuts on the end stop 50 as shown in FIG. 20(b), moving the one end of the scraper along the end stop to point A' with the other end thereof abutting on the guide, moving the scraper along the guide to point B' at a stroke without changing the angle of contact with the guide, further moving the one end of the scraper from point B' to point B along the end stop, thereby allowing the particles of the upper course to cave into the thus formed cavity, and finally removing the scraper and auxiliary guide from the particle courses. The resultant courses of dry particles formed with a ring pattern are set into an integral mass as they are or after the upper surface is made even and, when necessary, overlaid with a backing layer. Use of the auxiliary guide 51 makes it possible to easily describe a clear circle even manually. Any other pattern can be easily expressed in the same manner as described above. Although the pattern has been expressed by scraping the lowermost course 11 of a plurality of particle courses which is in contact with the base surface as shown in FIG. 4, a pattern may be expressed as shown in FIG. 5 by using a scraper having a height corresponding to the total thickness of the upper and lower courses and scraping these courses.

FIG. 21 and FIG. 22 show shaped articles 16 each expressed with an elliptical pattern 18. These shaped articles can be produced by using a scraper 20 formed into an elliptical shape from a plate strap as shown in FIG. 23, and following the method of FIG. 4 or FIG. 5. The height of the scraper may be either that capable of scraping the lower course alone or that capable of scraping the upper and lower courses. FIG. 21 shows an example wherein the scraper inserted into the courses is reciprocated in the direction of the transverse axis of the ellipse as shown in FIG. 23 (arrow A) to form cavities in the lower course. In the case of FIG. 22, the scraper is rotated by 5 degrees about a shaft 36 mounted at the center of the ellipse (arrow B) to form cavities in the lower course. The particles of the upper course are allowed to cave into each of the cavities to form particle courses having a patterned lower course. These are set in the same manner as in the previous examples.

Figure 25A:
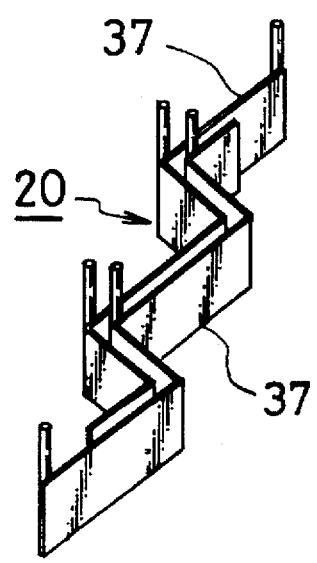
FIG. 25(a) is a perspective view showing a fourteenth example of the scraper for expressing a pattern on the shaped article of FIG. 24.
Figure 25B:
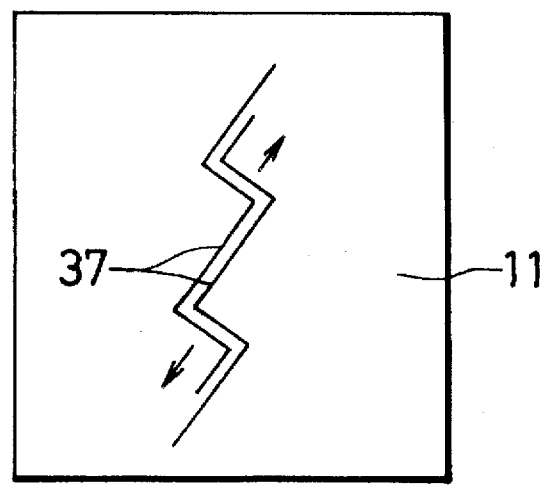
FIG. 25(b) is an explanatory view showing how to express a pattern using the scraper of FIG. 25(a).

FIG. 24 shows a shaped article having a lightning pattern 18. This article can be produced by using a scraper 20 formed of two identical metal straps 37 and 37 bent zigzag into a lightning shape, and expressing a pattern in accordance with the method of FIG. 4 or FIG. 5. The height of the scraper may be either that capable of scraping the lower course 11 alone or that capable of scraping the upper and lower courses. As shown in FIG. 25(b), the scraper is inserted into the courses of dry particles on the base surface and moved so as to separate the two straps from each other. A pattern is formed by causing the pattern particles of the upper course to cave into the cavities thus formed in the lower course by the movement of the scraper. The resultant courses are set and shaped into a shaped article.

Figure 26:
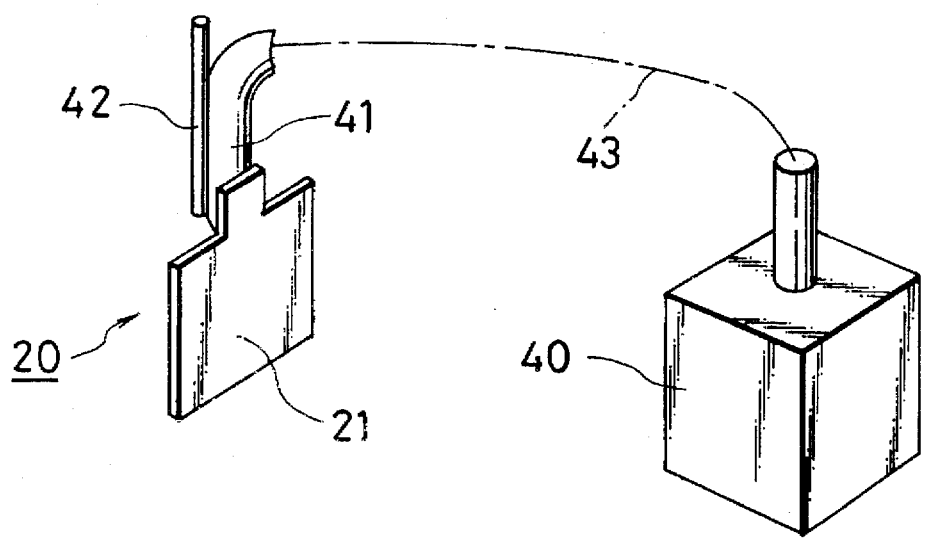
FIG. 26 is a perspective view showing a first example of a scraper with a suction port, used in the method of the present invention.
Figure 27A:
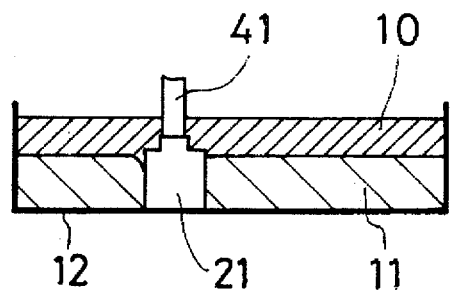
FIG. 27(a) is a cross section showing a cavity formed by the scraper with suction port of FIG. 26.
Figure 27B:
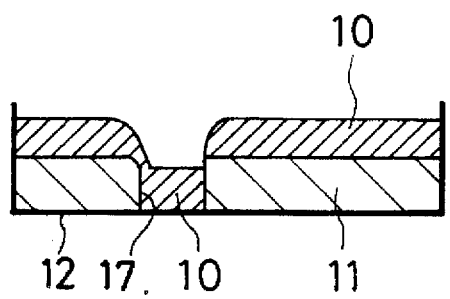
FIG. 27(b) is a cross section showing the particles of the upper course having caved into the cavity of FIG. 27(a).

The shaped article 16 having the arrow pattern 18 shown in FIG. 1 can be produced in accordance with the method of the second invention by using a scraper 20 comprising a thin scraper plate 21 of a height substantially the same as the thickness of the lower course under the upper course as shown in FIG. 26 and FIG. 27 and a suction device 40 having a cylindrical suction port 41 integral with the scraper plate and, when necessary, a slender breather pipe 42 disposed near the suction port, inserting the scraper plate 21 into the upper and lower courses 10 and 11 of two kinds of dry particles superposed on the base surface 12 which is the bottom plate of a form at point A in FIG. 3 until the lower end of the scraper plate abuts on the base surface so that the upper end of the scraper plate of the scraper is positioned at substantially the same height as the thickness of the lower course and that the suction port 41 is disposed at that position and projects upward out of the upper course (Refer to FIG. 27(a).) and is connected to the suction device via a connection pipe, moving the scraper 20 up in a straight line at an angle of 45 degrees toward $B_1$. In this case, the angle of the scraper relative to its advancing direction is kept constant (45 degrees in this example). As the scraper advances, one edge thereof cuts the particles of the lower course vertically and the scraped excess particles on the other side are removed by suction by the suction device 40 via the suction port 41 and connection pipe 43. Therefore, differently from the case of the first invention, no ridge is formed on the other edge, the both edges are of substantially the same shape, and the scraper leaves a cavity formed in its wake at a position backward of the direction of advance. As a result, as shown in FIG. 27(b), the particles of the upper course having the lower surface through which the scraper plate passed are allowed to cave into the thus formed cavity 17. Thereafter, in the same manner as in the case of the first invention, the scraper plate 21 is reinserted at point A of FIG. 3 and moved down in a curving movement at an angle of 45 degrees toward $B_2$ to form a cavity. The particles of the upper course are allowed to cave into the cavity to express a pattern on the lower surface of the lower course 11. The courses are set into an integral mass either as they are or after the upper surface is made even and, when necessary, overlaid with a backing course. The shapes and the combination of the scraper and the suction port are not limited to this example. Various shapes and combinations can be adopted optionally. The meaning of scrape used herein encompasses raking, plowing, digging and the like.

Figure 28:
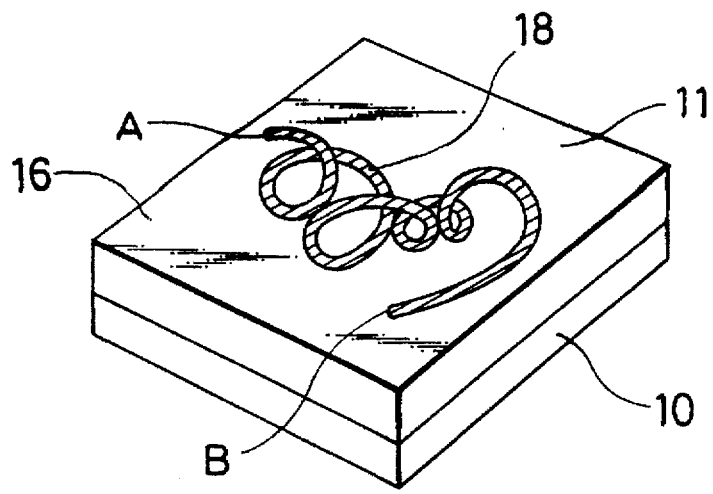
FIG. 28 is a perspective view showing an eighth example of the shaped article produced by the method of the present invention.
Figure 29:
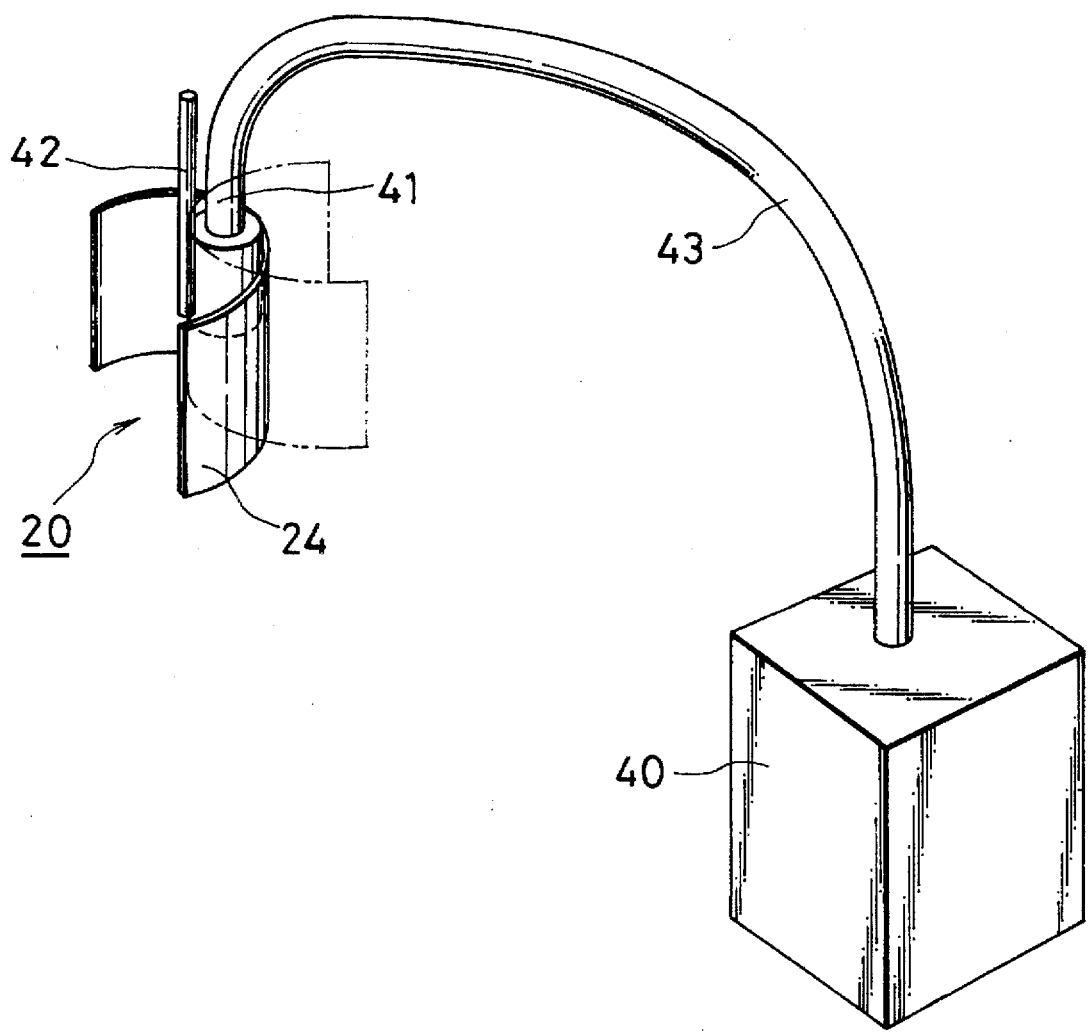
FIG. 29 is a perspective view showing a second example of the scraper with suction port, used in the method of the present invention.
Figures 30A, 30B:
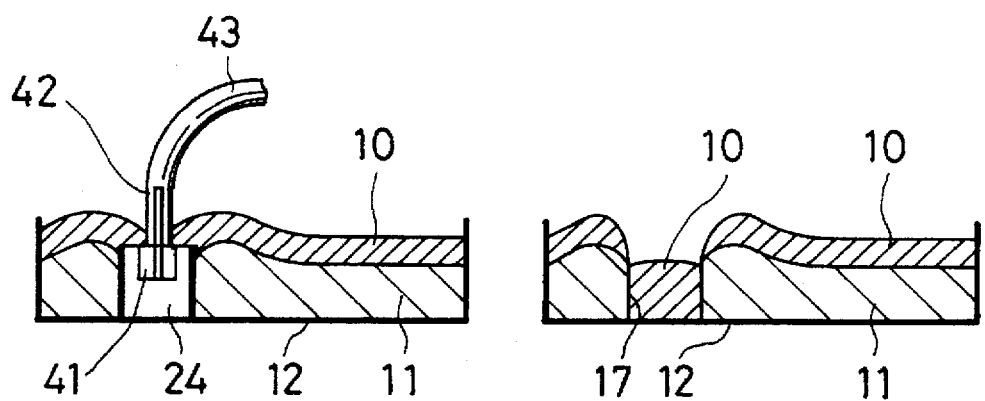
FIG. 30(a) is a cross section showing a cavity formed by the scraper with suction port of FIG. 29.
FIG. 30(b) is a cross section showing the particles of the upper course having caved into the cavity of FIG. 30(a).

FIG. 28 shows a shaped article on which there is formed a pattern consisting of a single stroke of uniform width, similar to that shown in FIG. 6 but different in shape at the starting point from that shown in FIG. 6. This shaped article can be produced in accordance with the method of the second invention using a scraper 20 shown in FIG. 29 and comprising, as shown in FIG. 29 and FIG. 30, a U-shaped scraper plate 24 of a height slightly larger than the thickness of the lower course under the upper course of dry particles and a suction port 41, about the lower end of which the scraper plate is rotatable and, when necessary, a blow pipe 42 provided near the suction port. The U-shaped scraper plate 24 is inserted into the upper and lower courses 10 and 11 of two kinds of dry particles overlapped on the base surface which is the bottom plate of a form at point A in FIG. 28 until the lower end of the scraper plate abuts the base surface, then the particles of the lower course at that point are removed by suction by the suction port 41 above the base surface, and the scraper plate is moved toward point B to describe a spiral pattern. In this case, a line of a constant width can be drawn by facing the U-shaped portion of the U-shaped scraper plate in the direction of advance. As the scraper advances, the particles of the lower course are scraped to form ridges on each side as shown in FIG. 30(a). By the movement of the scraper, a cavity 17 is formed in the wake of the scraper and, as shown in FIG. 30(b), the particles of the upper course remaining without being scraped are allowed to cave into the cavity. The particles are then allowed to set into an integral mass, either as they are or after being smoothed at the upper surface and, if necessary, overlaid with a backing course. When the suction port 41 is used to continuously effect suction from point A to point B, even if the Base surface should have large irregularities, the particles not scraped can be neatly removed to enable a clear-cut pattern to be expressed. The finished pattern has a round start point A and a round terminal point B as shown in FIG. 28. In this example, the width of the line formed is constant. However, this is by no means limitative. Various line widths can be obtained by varying the shape and material of the scraper, the angle of contact of the scraper relative to the base surface, etc. Each of the movement speed of the scraper and the intensity of suction for removal is controlled to a required value.

The shaped article shown in FIG. 12 can be produced in accordance with the method of the second invention using a combination of a rod 38 and a suction port 41 of a suction device 40 as a scraper. A white lower course 11, a red intermediate course 14 and a blue upper course 15 all of dry particles are successively overlapped on the base surface and, in the same manner as in the first invention, the rod 38 is first inserted at position A1 of FIG. 12 as shown in FIG. 32 and moved toward position B1 while the suction device 40 is actuated. As a result, the blue particles of the upper course is removed by suction and the white course 11 and the red intermediate course 14 are scraped (FIG. 32(a)). By the movement of the scraper, a cavity is formed in the wake of the scraper and, by applying vibration to or scraping up the particles, the red particles of the intermediate course are allowed to cave into the cavity to express a red dot-like pattern on the bottom surface of the lower course (FIG. 32(b)). Thereafter the rod is reinserted at position A2 and moved toward position B2. At this time, if the suction device should cease to operate, the particles of the lower, intermediate and upper courses are all scraped (FIG. 33(a)) to form cavities in the wake of the advancing scraper. By applying vibration to or raking up the particles, the cavity formed in the lower course is filled with the blue particles of the upper course due to the cave-in action to express a blue dot-like pattern on the bottom surface of the lower course 15 (FIG. 33(b)). In this way, red and blue dot-like patters are alternately formed from A3–B3 to A14–B14, thereby expressing a pattern of the letter "B" as a whole. Upon completion of this expression, the courses are allowed to set into an integral mass either as they are or after the upper surface is smoothed and, when necessary, overlaid with a backing course. A combination of a support member such as a plate with a plurality of scraping members can be used as a scraper and, by associating the combination with various kinds of auxiliary members and fittings, there can be adopted various methods of expression and methods of filling utilizing the cave-in action. In the example of FIG. 12, a dot-like pattern is formed by linearly moving the scraper. However, a dot-like pattern can be expressed by moving the scraper at a large amplitude, moving the scraper so as to describe a circle or spirally moving the scraper from a center point. In these cases, the size of a dot is determined depending on the amount of the movement of the scraper.

Figure 34:
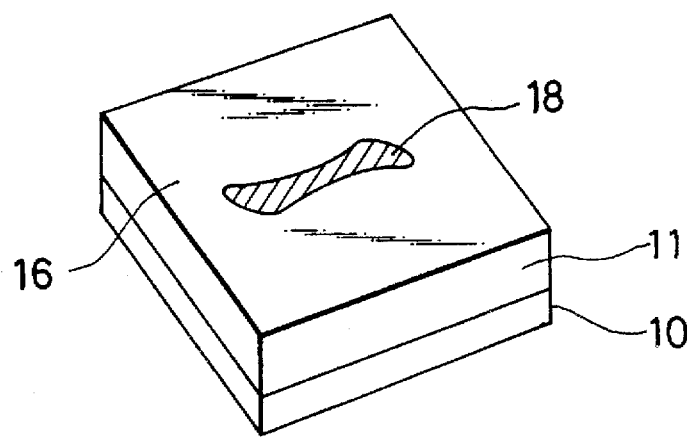
FIG. 34 is a perspective view showing a ninth example of the shaped article produced by the method of the present invention.
Figure 35:
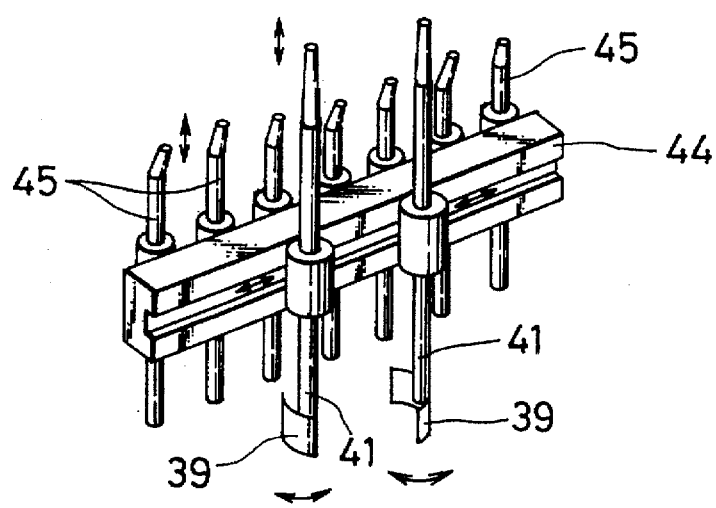
FIG. 35 is a perspective view showing a first example of a scraping/suction head for expressing a pattern of the shaped article of FIG. 34.
Figure 36:
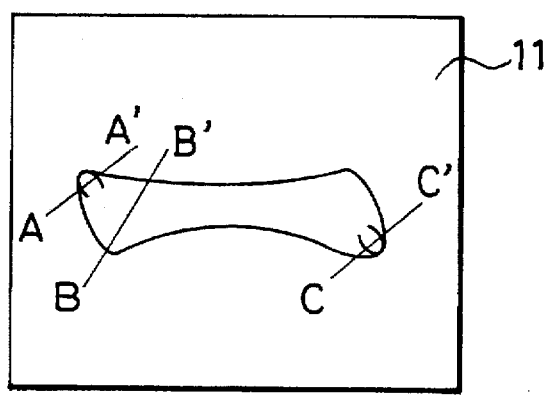
FIG. 36 is an explanatory view showing how to move scraper pieces of the head of FIG. 35.
Figure 37A:
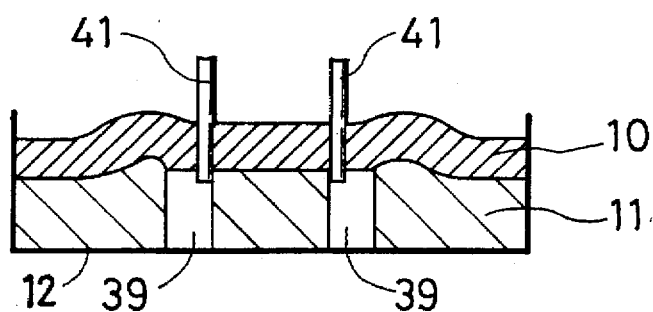
FIG. 37(a) is a cross section showing the particles scraped by the scraper pieces of the head of FIG. 35.
Figure 37B:
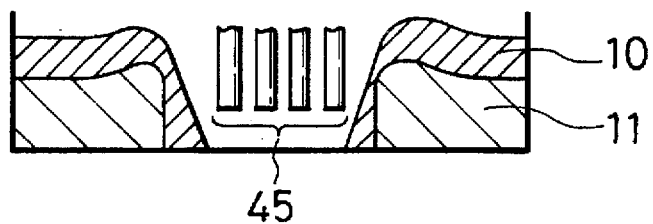
FIG. 37(b) is a cross section showing a cavity formed by suction removing the particles within the configuration of a pattern with suction pipes of the head of FIG. 35.
Figure 37C:
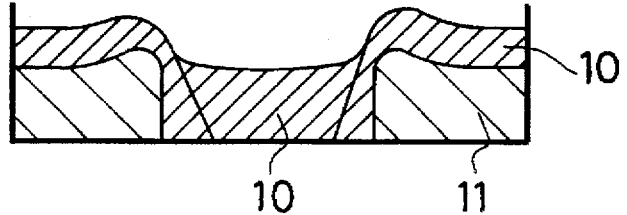
FIG. 37(c) is a cross section showing the cavity of FIG. 37(b) filled with particles.

FIG. 34 shows a shaped article expressed with a pattern 18 of a Chinese letter meaning "one" as if it should be written with a writing brush. In this example, the Chinese letter in black is formed in a white surface course on a black back course, and the particles for the Chinese letter are the same as those for the back course. This shaped article can be produced in accordance with the method of the second invention using a scraping and suction-removing head of FIG. 35 comprising a pair of rotatable suction ports 41, a pair of symmetrical streamlined scraper members 39 (having a height slightly larger than the thickness of a lower course to be described later or slightly larger than the total thickness of the lower course and an upper course 10) attached to the lower ends of the suction ports 41 so that they can be separate from each other and close to each other until they embrace each other like the folded palms, a support member 44 for supporting the suction ports thereon so that they can be independently moved laterally, seven suction pipes 45 supported on the support member so that they can be independently moved vertically, and openable and closable gates provided between the suction ports and the suction pipes and between the suction ports and a suction device. As shown in FIG. 36 and FIG. 37, a lower course 11 of white particles is first formed on the base surface and an upper course 10 of black particles is then formed on the lower course. The streamlined scraper members 39, 39 kept in the form of the folded palms are then inserted at a position A–A' and, in this state, the particles (those of either one or both of the lower and upper courses) at the insertion position are removed by suction through the suction ports 41, 41 having the scraper members. As a result, the black particles of the upper course outside the scraper members 39, 39 kept in the form of the folded palms are allowed to cave into the cavity formed by the suction removal to form the initial configuration of a pattern. Thereafter, the suction from the suction ports is stopped, the streamlined scraper members kept in the form of the folded palms at the position A–A' are separate from each other, and the suction ports 41, 41 are rotated to change the angle of the scraper members to comply with the configuration to be expressed. The scraper members are moved to a position B–B' and further to a position C–C' shown in FIG. 46, thereby allowing the black particles of the upper course to cave along the configuration formed in the wake of the scraper members. Immediately thereafter, the necessary suction pipes 45 provided on the support member are lowered to remove by suction the particles of the upper and lower courses inside the configuration of the pattern formed by the scraper members, thereby forming a cavity (FIGS. 37(a), FIG. 37(b)). In this case, a necessary number of suction pipes of the seven suction pipes 45 shown in FIG. 35 are lowered near the base surface to effect suction. The cavity thus formed by suction removal as shown in FIG. 37(c) is then filled with black particles 10' same in kind as the black particles of the upper course to form the pattern of the Chinese letter on the bottom surface of the lower course. The resultant particles are allowed to set into an integral mass either as they are or after the upper surface thereof is smoothened and, when necessary, overlaid with a backing layer. The shape of the scraper, shape of the suction port, scraping procedure and suction removing procedure are not limited to those mentioned above. Various shapes and procedures can be adopted to express high-degree patterns including letters in script with a writing brush.

Figure 38:
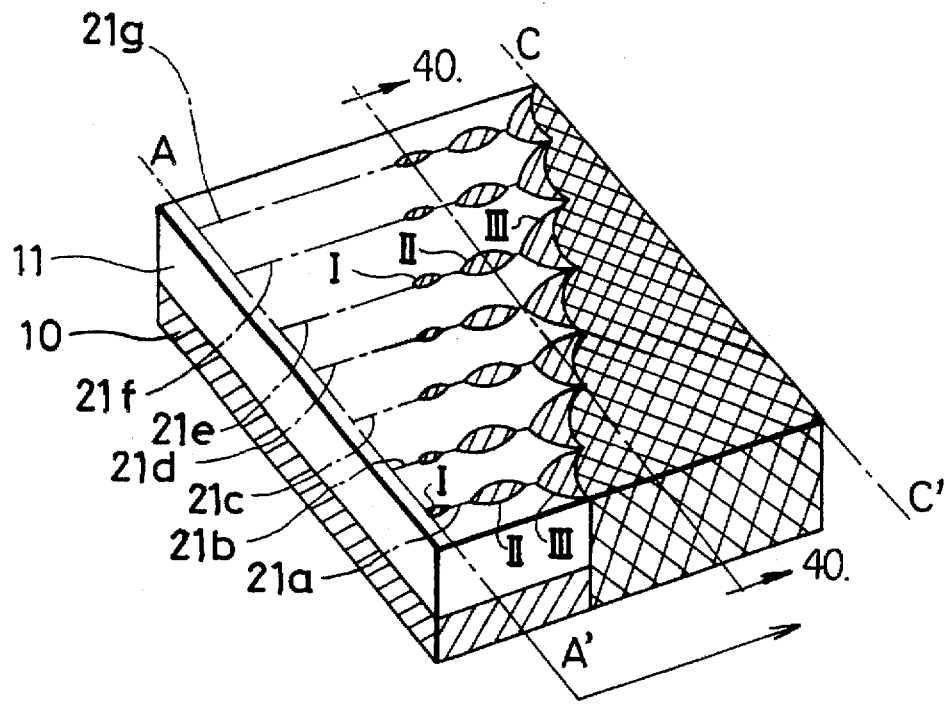
FIG. 38 is a perspective view showing a tenth example of the shaped article produced by the method of the present invention.
Figure 39:
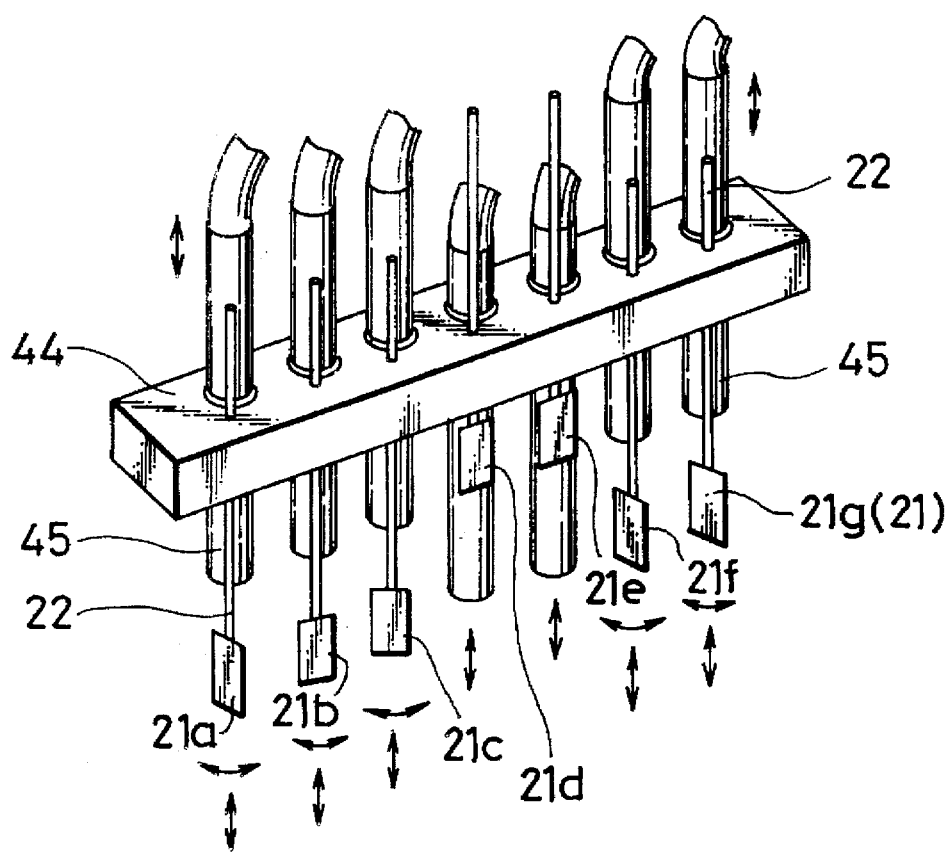
FIG. 39 is a perspective view showing a second example of the scraping/suction head for expressing a pattern of the shaped article of FIG. 38.
Figure 40:
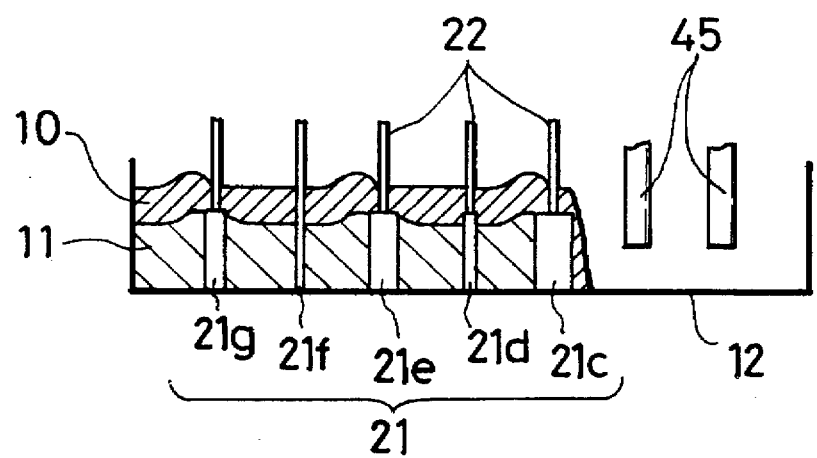
FIG. 40 is a cross section showing the scraping/suction head of FIG. 39 expressing a pattern on line B–B' of FIG. 38.
Figure 41A:
FIGS. 41(a), (b), (c) and (d) are perspective views showing four examples of end stops used in the method of the present invention.
Figure 41B:
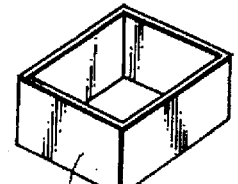
Figure 41C:
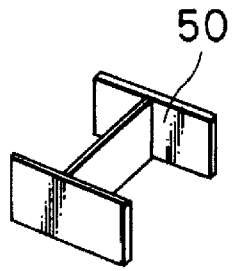
Figure 41D:
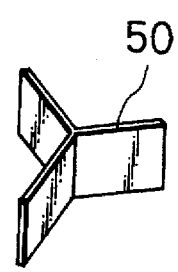
Figure 42A:
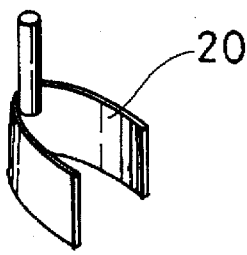
FIGS. 42(a), (b), (c) and (d) are perspective views showing four examples of scrapers used in the method of the present invention.
Figure 42B:
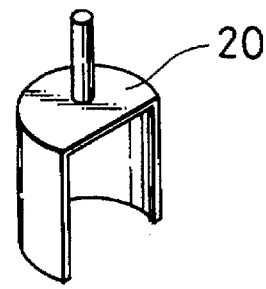
Figure 42C:
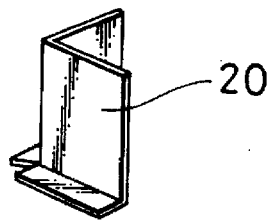
Figure 42D:
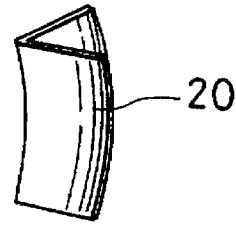

FIG. 38 shows a shaped article formed with a pattern of the edge portion of the wing of a bird comprising a white top course, a black bottom course and a yellow course partially throughout the total thickness of the top and bottom courses, with black patterns in the white top course. The particles of the bottom course are the same in kind as those of the black patterns. This shaped article can be produced in accordance with the method of the second invention using a scraping and suction-removing head of FIG. 39 comprising a support member 44, seven suction pipes 45 aligned and attached to the support member so that they can be independently moved vertically, seven shafts 22 rotatably attached vertically movably to the support member along the side surfaces of the seven suction pipes, respectively, square scraper members 21 (21a, 21b, 21c, 21d, 21e, 21f, 21g) of a length slightly larger than the thickness of the lower course attached to the lower ends of the shafts, respectively so that they can be moved above and below the lower end of the suction pipes by the movement of the shafts and can be rotated by the rotation of the shafts when they are positioned below the suction pipes, and gates openable and closable independently between the suction pipes and a suction device. After a lower course 11 of white particles and an upper course 10 of black particles are formed on the base surface 12, the scraping and suction removing head is set in place, with all the scraper members moved below the suction ports and inserted at a prescribed start position (A–A') in FIG. 38 until they reach the base surface with their respective one side surfaces directed in the direction of advance. The scraping and suction removing head is moved from the position A–A' to a position C–C' while the scraper members are rotated and restored to their original posture, thereby allowing the black particles of the upper course to cave into the cavities formed in the lower course in the wake of the scraper members in the same manner as in FIG. 1 to express black dot-like patterns. As soon as the head advances, the scraper member 21a is gradually rotated by about 10° and then restored to its original posture to express a first small dot pattern I. A little later, the same scraper member is again rotated gradually by about 30° and then restored to its original posture to express a next dot-like pattern II. A little later, the same scraper member is again rotated gradually by about 45° and, as soon as the head is moved by a small distance, the same scraper member is raised above the lower end of the associated suction port to express a next pattern III. At the same time, the suction pipe aside of the scraper member 21a is lowered and inserted into the particle course and the associated gate is opened to start suction from the position of insertion. As the scraping and suction removing head advances, the particles of the upper and lower courses are removed by suction to form a cavity, which is filled with yellow particles by a suitable method to express a pattern. The scraper member 21b is lowered when the scraper member 21a has been rotated by about 10° at the initial scrape, and is operated in the same manner as in the case of the scraper member 21a to express patterns I, II and III. The suction pipe aside of the scraper member 21b is then lowered and removes the particles of the upper and lower courses by suction to form a cavity, which is filled with yellow particles. In this way, the scraper members 21a, 21b, . . . 21f and 21g are inserted into the particles of the lower course with a small time lag and gradually rotated and restored to their original posture to express patterns I, II and III in a slightly displaced fashion as a whole and, at the same time, the suction pipes are lowered with a small time lag and suck the particles of the upper and lower courses to form cavities, which are filled with yellow particles. Filling of yellow particles may be carried out at the same time in the final step. How to express the aforementioned patterns will be explained with reference to FIG. 40 which is a cross section at the position B–B'. At the positions of the scraper members 21a and 21b, the suction pipes 45 are lowered and remove the particles by suction. The scraper member 21c scrapes the particles at about 45°. The scraper member 21d is placed with its one side surface faced in the direction of advance of the head and, therefore, advances straightforward without scraping the particles. The scraper member 21e scrapes the particles at about 30°. The scraper member 21f is placed with its one side surface faced in the direction of advance of the head and, therefore, advances straightforward without scraping the particles. The scraper member 21g scrapes the particles at about 10°. Upon completion of the expression of the pattern of the edge portion of the wing of a bird, the particles are allowed to set into an integral mass either as they are or after the upper surface is smoothened and, when necessary, overlaid with a backing course. The shape of the scraper, shape of the suction pipe, scraping procedure and suction removing procedure are not limited to those mentioned above. Various shapes and procedures can be adopted to express various patterns.

In any of the examples, it is optional how a pattern should be expressed by the use of what kind of a scraper and, by combining these with the material for the base surface and an auxiliary implement, various patterns including the patterns mentioned above can be expressed. The meaning of scrape encompasses raking, plowing, digging and the like. By combining these movements, further various patterns can be expressed.

Scrapers of various shapes, various kinds of materials and various combinations can be used. The material for the scraper includes metal, ceramic, plastic, rubber, paper, wood, nonwoven fabric, woven fabric and any other material insofar as it can scrape the particles. Since the scraper is caused to abut on the base surface, a combination of the material for the scraper and that for the base surface which can tightly contact each other is desirable in order to express sharply defined patterns.

While the height of the scraper can be either equal to or greater than the thickness of the lower course, for ease of handling it is preferable for the entire scraper including a slender support member to be slightly taller than the total thickness of the upper and lower courses.

Figures 43A, 43B, 43C:
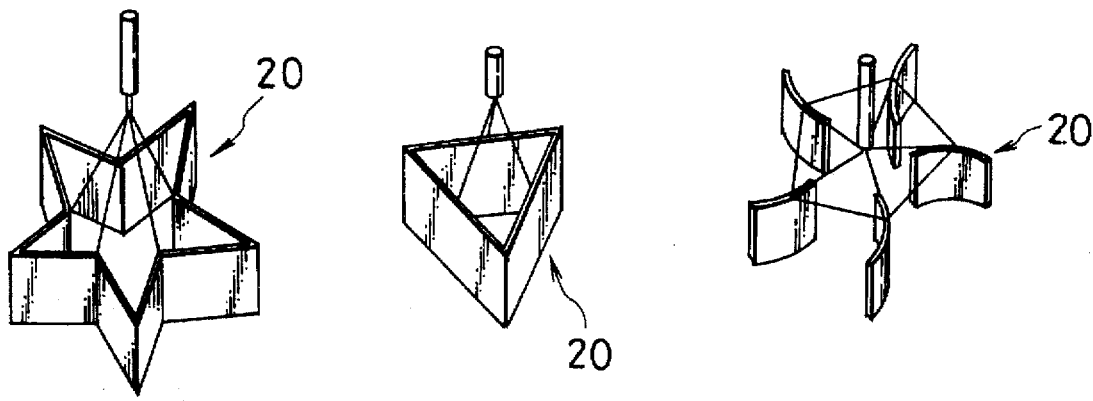
FIGS. 43(a), (b) and (c) are perspective views showing three further examples of scrapers used in the method of the present invention.
Figure 44:
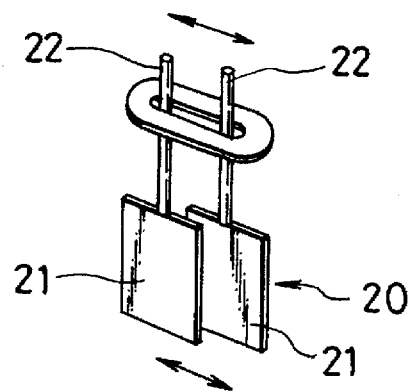
FIG. 44 is a perspective view showing a first example of a movable scraper used in the method of the present invention.
Figures 45A, 45B:
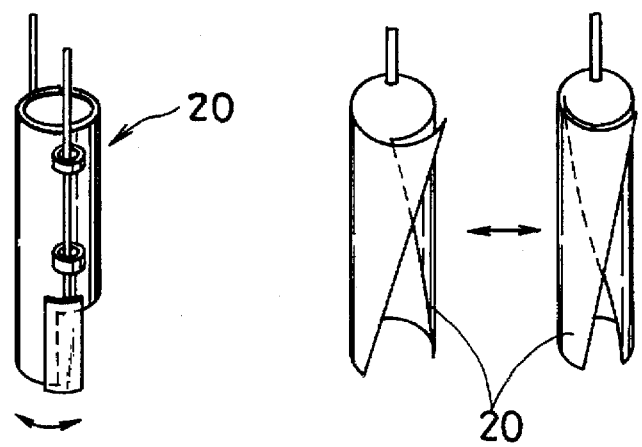
FIGS. 45(a) and (b) are perspective views showing a second example and a third example of the movable scrapers used in the method of the present invention.
Figure 46:
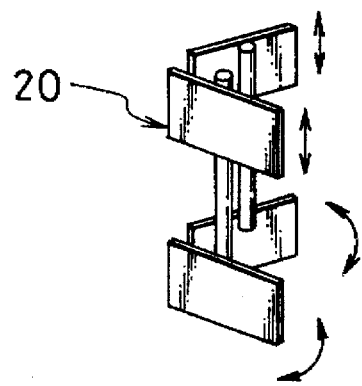
FIG. 46 is a perspective view showing a fourth example of the movable scraper used in the method of the present invention.

The scraper can be simple in shape, such as those shown in FIG. 2 and FIG. 31, or square, curved, V-shaped or U-shaped, or skirted as shown in FIG. 42 or bow-shaped, or in the shape of oval shown in FIG. 23, in addition to the round cylindrical shape shown in FIG. 13 and FIG. 14, while other shapes include the triangular and star-shaped arrangements of FIG. 43, and the configuration with the notches shown in FIG. 13 and FIG. 14. The scraper can be configured as multiple rod members arranged in a line or matrix that can be folded, or the type of arrangement shown in FIG. 15(b) and FIG. 15(c) can be used so that rods not required can be retracted up and that rods required can only be used. In the case of the scraper shown in FIG. 15(a) having a support member integral with a plurality of scraper members of a shape corresponding to a pattern to be expressed, for example, the pattern can be expressed at a stroke and, if vibration is imparted to both the scraper members and the support member, the particles of the upper layer can cave into and fill the formed cavities at a stroke with high efficiency. Therefore, this example is desirable because of high productivity.

In any of the cases where the particles are allowed to cave into and fill the cavity in the lower course by scraping the lower course only and where the particles are allowed to cave into and fill the cavity in the lower course by scraping both the lower course and the upper course, it is preferable to scrape up or apply vibration to the upper course in order for the cavity in the lower course to be filled with the different kind of particles of the upper course due to their cave-in action. In the case where the particles are allowed to cave into and fill the cavity in the lower course by scraping both the lower course and the upper course, it is preferable to provide a scraping-up member near or integrally with the scraper as shown in FIG. 11. Use of a scraper with a scraping-up member in the case where the upper course is disposed on the entire upper surface of the lower course as shown in FIG. 7(b) enables the amount of particles scraped up to correspond to the amount of particles scraped and the scraped-up particles to cave into and fill the cavity in the lower course, and makes it possible to continuously scrape, scrape up and rake up the particles. This is highly efficient. The shape of the scraping-up member is not limited to those shown in the drawings, but other members of various shapes can be used. It is preferable to provide the scraper and the support member supporting the scraper thereon with a vibrator for imparting vibration to the scraper. By so doing, the cave-in action of the particles proceeds with preferable efficiency as the scraper advances. In any of the cases described above, it is preferable to provide the scraper with various kinds of auxiliary members, auxiliary implements and auxiliary devices as occasion demands.

In any of these cases, line patterns of various thicknesses can be expressed by varying the angle of the scraper relative to its advancing direction or by changing the angle of contact between the scraper and the base surface.

Figure 47A:
FIG. 47(a) is a plan view showing the movement of a fifth example of the movable scraper used in the method of the present invention.
Figure 47B:
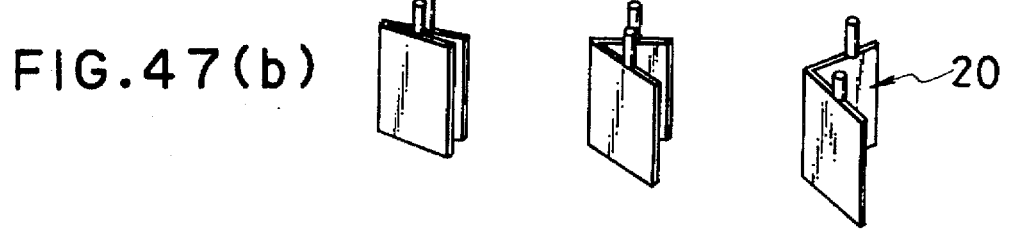
FIG. 47(b) is a perspective view showing the scraper of FIG. 47(a).
Figure 47C:
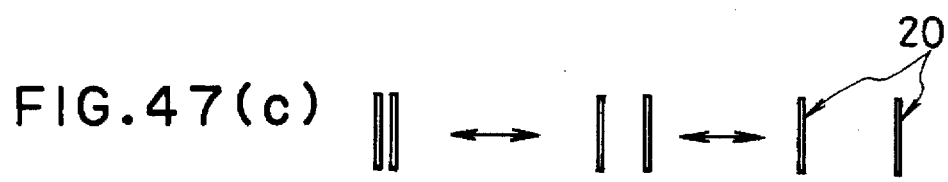
FIG. 47(c) is a plan view showing the movement of a sixth example of the movable scraper used in the method of the present invention.
Figure 47D:
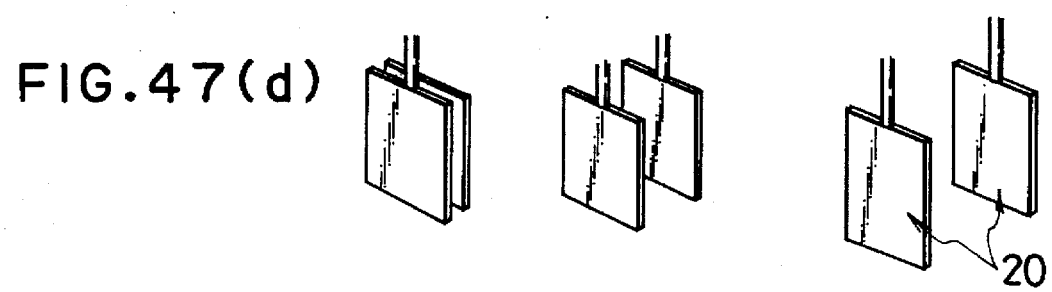
FIG. 47(d) is a perspective view showing the scraper of FIG. 47(c).
Figure 48A:
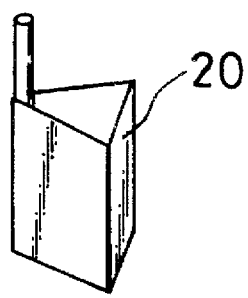
FIG. 48(a) is a perspective view showing a triangular scraper used in the present invention.
Figure 48C:
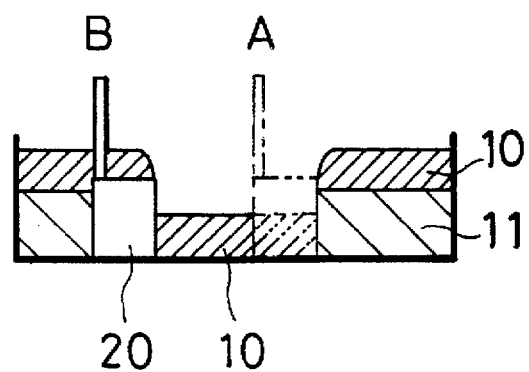
FIG. 48(c) is a cross section taken along line Y—Y in FIG. 48(b).
Figure 48B:
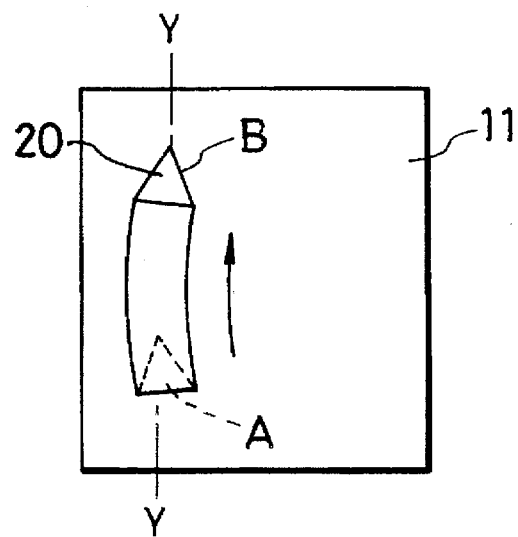
FIG. 48(b) is a plan view showing the movement of the scraper of FIG. 48(a).
Figure 48D:
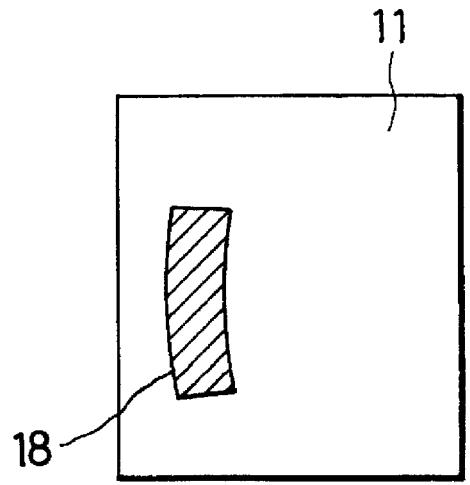
FIG. 48(d) is a plan view showing a pattern expressed on a particle course.
Figure 49:
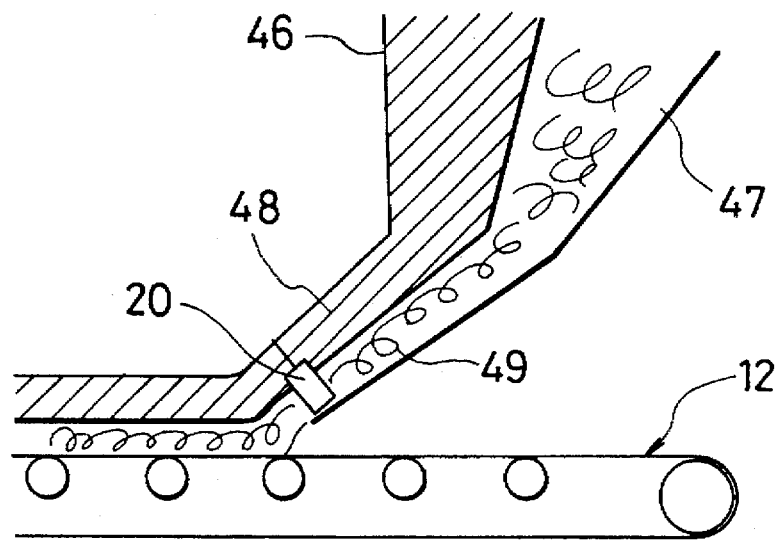
FIG. 49 is a cross section showing the principal part of an apparatus used in the method of the present invention for continuously producing patterned shaped articles.

Scrapers of variable types are preferably used. Examples thereof include that of width variable type shown in FIG. 44, that of rear opening variable type shown in FIG. 45 and those shown in FIG. 46 and FIG. 47(a) to FIG. 47(d) in which two plates can be close to and away from each other and are variable in direction. In addition, the scraper, its support member, and the suction port and its support member of the second invention can be made of shape memory alloy or shape memory plastic, whereby the shapes thereof are variable depending on variation in temperature. Another example of scraper is a triangular tube having a height substantially equal to the thickness of the lower course as shown in FIG. 48(a). This scraper is inserted into the upper and lower courses at point A and moved toward point B. The particles of the lower course having entered the tube at point A are moved to point B, thereby forming a cavity which is filled with the particles of the upper course by their cave-in action to express a pattern rearward and outward of the tube as shown in FIGS. 47(b), 47(c) and 47(d). However, this is by no means limitative and scrapers of various shapes and mechanisms can be used.

Scrapers used singly or in line or matrix arrays can be directly controlled by a computer to form patterns. This makes it possible to increase productivity. It is preferable to use an arrangement in which the scraper angle and speed can be controlled to enable patterns to be freely changed or modified. This will make it possible to produce complex, sophisticated patterns. Using end stops 50 such as those shown in FIG. 41(a) to 41(d) to guide the start, intersection and end point scraper movements provides patterns with neat start, intersection and end points. In any of the examples, the start, intersection and end points can be expressed in various shapes by changing the shapes of the end stops used to protect the start, intersection and end points. It is preferable that the end stops are incorporated into a device so that they can be moved vertically near the scraper, because the end stops can be lowered and used when necessary.

As for the base surface, it is possible to use the bottom plate of a form or a sheet, belt, board or the like, the bottom plate of a double action or other type press, the bottom plate of a form placed on a conveyor, or a belt conveyor or other such endless surface. The particle course can be placed on a board, sheet or other such base surface either as it is or turned upside down.

Although the base surface can be of any material, it is preferable to use a material that readily slides such as glass, ceramics, plastic, metal and the like. As such, a material will enable the scraper to remove particles more thoroughly.

As for the material for the base surface, it is also preferable to use rubber, sponge, paper, nonwoven fabric, woven fabric or other somewhat bulky or elastic material. This is because when the scraper is pressed onto a base surface formed of such a material the bulk or elasticity of the material enables absorption of play between the base surface and the scraper and ready positioning of the scraper in the direction of height and, therefore, enables better scraper action and sharper pattern lines. A similar effect can also be obtained by pressing all or part of the scraper with a spring or an elastic body made of rubber or the like or by attaching thread, string or other such elastic material to the base surface portion contacted by the scraper. In this case too, it is preferable to use a slippery base surface material such as a material that will enable the scraper to remove particles more thoroughly.

It is also preferable that the nonwoven fabric, woven fabric, paper or the like used for the base surface is gas-permeable, liquid-permeable and also liquid-absorbant as this assists deaeration, thereby removing excess liquid and ensuring that the shaped article is of uniform strength.

In any of the examples, the dry particle courses can be formed by various methods such as a squeegee type course forming method, or by using a sliding supply tank, a supply tank with a slitted nozzle, or a rotary feeder, or by employing a dense cellular body or a projection bristling body.

As for a method for forming two or more courses, the lower course contacting the base surface is formed by the squeegee type course forming method, or by using a sliding supply tank, a supply tank with a slitted nozzle, or a rotary feeder, or by employing a dense cellular body or a projection bristling body as described above, and a second and upper courses are formed by either a partial course forming method or an entire course forming method. The partial course forming method may be carried out either in advance or immediately before the scraping action. By providing a particle supply port near or integrally with the scraper to constitute a simple device enabling the partial course formation method to be effected immediately before the scraping action, partial courses can be continuously formed. This is preferable due to possible realization of ready automatization and high productivity. In the case where the upper course is partially disposed on the lower course, it is preferable in the aspects that colored particles can be supplied to a necessary portion and that the color and material of the particles can be changed. In the case where the upper course is entirely disposed on the lower course, it is preferable in the aspects that scraping can be effected at high speed, that the degree of freedom in expressing patterns after the formation of the courses is enhanced, and that the productivity becomes high.

In any of the examples described herein, the scraping operation can be done manually or by various kinds of robots, positioning devices and other mechanical devices, which include, for example, a parallel linkage positioning device, a cartesian coordinate positioning device, a cartesian coordinate robot, an articulated coordinate robot, a cylindrical coordinate robot and a polar coordinate robot. Any of these mechanical devices can be provided with various kinds of auxiliary implements, auxiliary members, auxiliary devices, etc. when necessary.

In any of the arrangements, the press plate below a double action press can be used as the base surface, and after a pattern has been formed on the press plate, the particles can be pressed into an integral mass with the press. In addition, it is possible first to cause a plurality of patterned shaped articles to set as a single large one which is later cut into individual articles.

Figure 50:
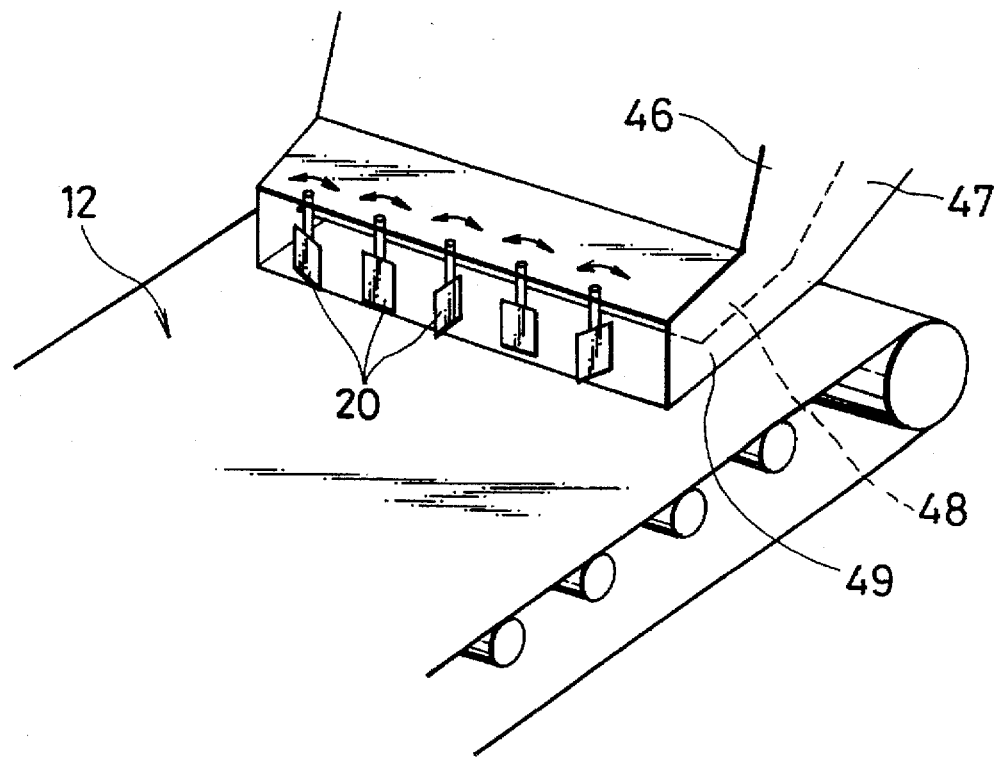
FIG. 50 is a perspective view showing the principal part of the apparatus of FIG. 49.
Figure 51A:
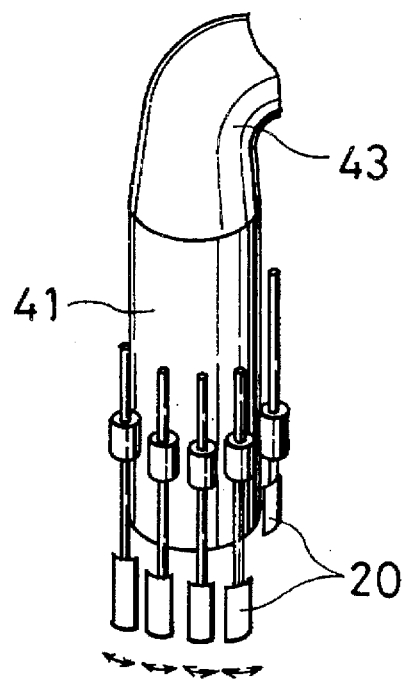
FIG. 51(a) is a perspective view showing a scraper with a suction port, used in the method of the present invention.
Figure 51B:
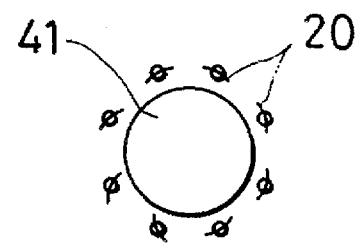
FIG. 51(b) is a plan view showing the principal part of the scraper of FIG. 51(a).
Figure 51C:
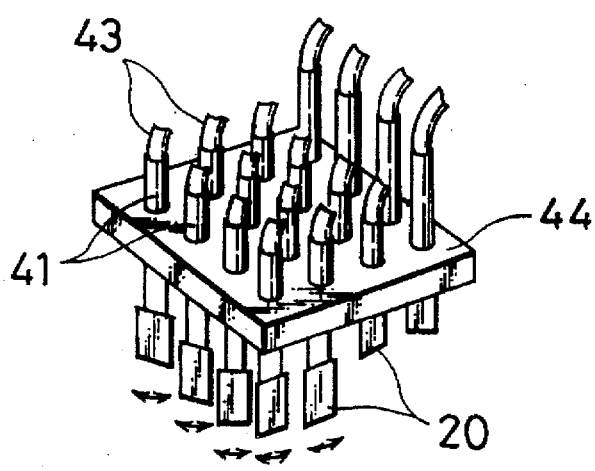
FIG. 51(c) is a perspective view showing another example of the scraper with suction port, used in the method of the present invention.
Figure 51D:
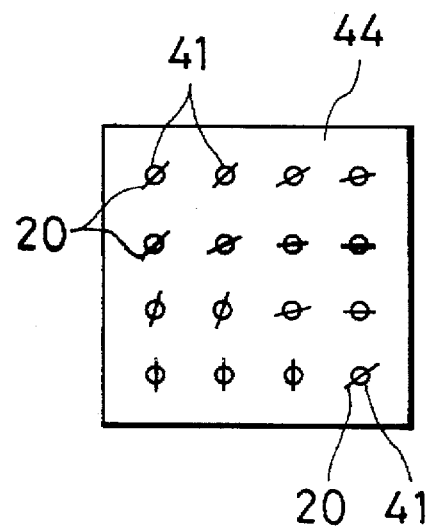
FIG. 51(d) is a plan view showing the principal part of the scraper of FIG. 51(c).

A pattern can be expressed by, while forming at least two courses in an endless manner on a conveyor etc., forming a cavity in the lower course using a scraper and filling the cavity with the particles of the upper course utilizing their cave-in action. FIG. 48 and FIG. 50 show molding apparatuses for satisfying the above. Two kinds of particles for the upper and lower courses are supplied from two hoppers 46 and 47 onto the upper surface of an endless conveyor serving as the base surface so that they are overlapped at chutes 48' and 49' in parallel with each other. The scraper 20 is disposed on the lower end of the chute for the lower course to scrape the particles of the lower course, thereby forming a cavity. The cavity thus formed is filled with the particles of the upper course supplied from the chute for the upper course utilizing their cave-in action. As a result, a strap of lengthy patterned shaped article is obtained. The strap is cut to a prescribed length and allowed to set. The set strap of a prescribed length is further cut into individual articles.

In the second invention, since the particles excessively remaining after scraping are immediately removed by suction, a preferable article with a clear-cut pattern can be obtained. In the case where the amount of particles to be scraped is large, the particles excessively remaining at the point of intersection etc. do not constitute any hindrance. In the case where the base surface has great irregularities, the particles having not been scraped can be removed neatly to express a sharply defined pattern. As shown in FIG. 28, the start point and terminal point can be formed neatly. In the case of expressing a pattern similar to the script written with a writing brush as shown in FIG. 34 and in the case where a pattern has a large area comprising dots etc. of different colors and a portion 100% changed in color, a clear-cut pattern of complicated configuration can be expressed with ease by removing by suction the entire portion exclusive of the pattern which has already been expressed by filling the cavities with particles owing to their cave-in action. In any of these cases, there can be used any combination of a scraper and a suction port, including the example of FIG. 35, the example of FIG. 39 comprising a plurality of scrapers and suction pipes in alignment with each other, an example of FIG. 51(a) comprising a plurality of annularly arranged scrapers 20 and at least one suction port 41 surrounded by the scrapers, and an example of FIG. 51(b) comprising a support member 44 and a plurality of scrapers 20 and suction ports 41 arranged in matrix arrays. Further, when necessary, the breather pipe (blow pipe) 42 shown in FIG. 26 and FIG. 29 can be provided aside of the suction port to effect ventilation or blowing-out while carrying out suction in order to enhance the suction efficiency. In this way, a combination of a plurality of scrapers, a breather pipe and a suction pipe enables various high-degree patterns including scripts written with a writing brush to be expressed.

In any of these arrangements, the degree of cave-in action of the particles is preferably controlled such as by slightly compressing the particles by application of pressure, changing the particle size distribution, slightly wetting the particles or by any other suitable means. By controlling the fluidity of the particles in this way, a further clear-cut pattern can be expressed.

In any of the cases mentioned above, when the particles of the upper course is allowed to cave into the cavity formed in the lower course, the upper surface of the upper course forms a cavity therein. This cavity is nullified by smoothening the upper surface of the upper course or being filled with particles. The particles with which the cavity is filled may be of the same kind of the lower course, the same kind of the upper course, or a different kind from either the upper course or the lower course. The kind of particles can be selected in accordance with a pattern to be expressed.

In producing a concrete shaped article, the course material is dry and consists mainly of cement powder, resin or a mixture thereof and may additionally include at least one of a pigment and fine aggregates. The material for a backing course consists mainly of cement powder, resin or a mixture thereof, the mixture further containing a fine aggregate and, if necessary, additionally containing a pigment and at least one of coarse aggregates and various kinds of fibers. The backing material may either be dry like the course material or in the form of a concrete slurry obtained by kneading with water etc.

Both the materials for the course and the material for the backing course may additionally include wood chips as aggregates or fine aggregates and may further include as blended therewith crushed or pulverized granite, crushed or pulverized marble, slag, light-reflecting particles, inorganic hollow bodies such as Shirasu balloons, particles of ceramics, new ceramics, metal, ore or other substances. They may also contain as additives a congealing and curing promoter, a waterproofing agent, an inflating agent and the like. The aforementioned various kinds of usable fibers include metal fibers, carbon fibers, synthetic fibers, glass fibers and the like.

All the materials are supplied to a form etc. and are allowed to set into an integral mass. Otherwise, after the material has been supplied, a prescribed amount of water is supplied to all portions of the interior of the form etc., thereby setting the materials into an integral mass within the form etc. If a wet material is used for the backing course, the amount of water supplied is reduced in view of the water contained in the wet material. When a plate of metal, wood, cement, glass or ceramic or a sheet of paper, nonwoven fabric, or woven fabric is used as the backing course, for example, it can be allowed to set integrally with the course. An asphaltic concrete shaped article can be produced using a thermal fusion material such as asphalt.

In producing an artificial stone shaped article, the dry materials for the course and the material for the backing course may, for example, be constituted of at least one of rock particles, ceramic particles, new ceramic particles, glass particles, plastic particles, wood chips and metal particles and may, as found necessary, further have mixed therewith a pigment etc. A setting agent added to bind the aggregates is composed mainly of a mixture of cement powder and water, a mixture of cement powder, resin and water, a mixture of resin and water, a mixture of resin and solvent, or a mixture of resin, water and solvent and may further contain particles of at least one of rock, ceramic, new ceramic, glass and plastic and may, as found necessary, be kneaded with a pigment or colorant and have mixed therewith various kinds of particles, various kinds of fibers, various kinds of mixing agents and various kinds of additives. The various kinds of particles include particles of slag, fly ash and fine light-reflecting substances. The various kinds of fibers include metal fibers, carbon fibers, synthetic fibers and glass fibers. The various kinds of mixing agents and additives include shrink proofing agents, congealing and setting promoters, delaying agents, waterproofing agents inflating agents, water reducing agents, fluidizing agents and the like.

For enhancing the adherence of the setting agent with the aforementioned dry materials, the dry materials can be sprayed with or immersed in water, solvent or surface treatment agent.

All the materials can be set into an integral mass within a form etc. by vacuum-suction treatment, centrifugal treatment or other such treatment for spreading the setting agent between adjacent particles or by using a mixture of an aggregate and a setting agent as the material for the backing course. When a plate of metal, wood, cement, glass or ceramic or a sheet of paper, nonwoven fabric, woven fabric or plastic is used as the backing course, the course can be allowed to set integrally therewith.

For producing a ceramic shaped article or the raw product for a ceramic shaped article, the dry materials for the course are mainly particles of one or more of clay, rock, glass, new ceramic, fine ceramic and glaze with or without a pigment or colorant added thereto. Although the materials are dry, they may have absorbed some water or a lubricant-bonding agent if they are not kneaded with the lubricant-bonding agent or water and are in a state readily amenable to pulverization. The material for the backing course is constituted mainly of particles of one or more of clay, rock, glass, new ceramic and fine ceramic and may additionally contain a pigment and a colorant. In the finished state, the backing course is required to differ from the course in color, luster, texture and the like and may be either dry, similarly to the course, or made wet by kneading with water or a lubricant-bonding agent. In addition, either the materials for the course or the material for the backing course may have further mixed therewith inorganic hollow bodies such as Shirasu balloons, and particles of ceramic, metal or ore and may have added thereto various kinds of foaming agents, fluidization-preventing agents, supernatant agents, lubricating agents, bonding agents and adherence promoters as additives.

The materials supplied into a form etc. are allowed or caused to set into an integral mass without adding or by adding a predetermined amount of water or lubricant-bonding agent to plasticize them and applying pressure to the resultant mixture. The set integral mass is removed from the form etc. and used as a raw product. The raw product is sintered to obtain a ceramic shaped article. Otherwise, the materials supplied into a refractory setter or similar form are melted or fused by heating to obtain an integral mass, and the integral mass is removed from the setter. Otherwise, a course of pattern particles is laid on a plate of metal, glass or ceramic, and melted or fused by heating to be integral with the plate. A patterned shaped article of enamel, stained glass or crystalline glass and similar patterned shaped articles can be produced by any of these methods.

In producing a raw product to be sintered into a metal shaped article, the dry materials for the course are mainly particles of one or more of metals and alloys and may, as found necessary, further have mixed therewith a lubricant. Although the materials are dry, they may have absorbed the lubricant if they are not kneaded with the lubricant and are in a state readily amenable to pulverization. The materials for the backing course are constituted mainly of particles of one or more of metals and alloys and may be either dry or made wet by kneading with a lubricant.

Examples of the lubricant used herein include zinc stearate and other lubricants. The dry materials for the course or the materials for the backing course may further contain a bonding agent and other additives.

All the materials are supplied into a main form etc., pressed therein and removed therefrom to obtain the raw product for a metal shaped article. The raw material is sintered into a metal shaped article. A metal shaped article may be produced by supplying all the materials onto a sheet of metal, glass, ceramic, etc., applying pressure to the resultant composite to obtain an integral mass of raw product, and sintering the integral mass.

The dry materials for the course used in producing a shaped article having an impasto layer are various kinds of powdered paint, and the material for the backing course is a plate, sheet or the like of metal, wood, cement or ceramic. The various kinds of powdered paint include acrylic resin, polyester resin, acrylic-polyester hybrid resin, fluorine resin and similar resins having a pigment or colorant added thereto. The pattern materials for the course are laid on the plate, sheet, etc. as a backing course, melted and fused by heating and baked to unite all the layers together. In uniting all the layers together, pressure may be applied to the layers. As a result, it is possible to obtain a plate, sheet, etc. having an impasto layer thereon.

In producing a plastic shaped article, the dry materials for the course are constituted mainly of particles of various kinds of plastics and may additionally contain a pigment or a colorant. The materials may also contain a plasticizer or solvent, but are not kneaded with a plasticizer or solvent and are in a state readily amenable to pulverization. The material for the backing course may be either dry or made wet by kneading with a plasticizer or solvent. The various kinds of plastics include polyethylene, nylon, polypropylene, polycarbonate, acetal, polystyrene, epoxy, vinyl chloride, natural rubber, synthetic rubber, ABS, PPO, EVA, fluorine resin and other thermoplastic and thermosetting resins. Both the materials for the course and the material for the backing course may, as found necessary, contain a foaming agent, oxidization preventing agent, thermal stabilizer, bridging agent, other additives and particles of inorganic materials and the like. All the materials are melted or fused into an integral mass by heating, while applying pressure thereto, if necessary. With this method, it is possible to produce a patterned shaped article of foamed styrol, a patterned shaped bathtub or floor tiles of plastic, etc. In this case, the layers may be united with a plate of metal, wood, cement, ceramic or a sheet of paper, nonwoven fabric, woven fabric or plastic.

In producing confectionery or other shaped foodstuffs, the dry materials for the course are constituted mainly of particles of one or more of wheat, rice, potato, bean, corn and sugar and may additionally contain seasonings and spices. The materials may also contain oil, water, etc., but are not kneaded with oil, water, etc. and are in a state readily amenable to pulverization. The material for the backing course may be either dry, similarly to the materials for the course, or made wet by kneading with oil, water, etc. Both the materials for the course and the material for the backing course may, as found necessary, further contain an inflating agent and other additives. All the materials are supplied into a form etc. and are allowed to set or caused to set without adding or by adding water, oil, etc. to plasticize them into an integral mass. The integral mass is pressed and then removed from the form etc. to obtain a raw product. The raw product is then baked. Otherwise, all the materials are baked within the form etc. With this method, it is possible to produce various patterned baked confectioneries etc. It is also possible to produce a patterned shaped article melted by heating, such as a patterned chocolate shaped article etc., by using particles of the material melted by heating, such as chocolate etc., and melting and fusing the particles by heating.

The materials that can be used in the present invention are not limited to those set out as examples herein and various other materials can also be used depending on the shaped article to be produced. Moreover, the range of patterned shaped articles that can be produced can be increased by combining various materials that, in the finished state, differ in property, color, luster, texture and the like. For example, use of casting sand and metal particles in combination with each other enables an article of cast iron and a sintered metal shaped article to be produced.

In the method for producing any of the patterned shaped articles, it is desirable to apply vibration when the materials are supplied onto the base surface so as to ensure smooth movement of the materials. Further, by rubbing with a brush or comb or applying a jet of air or water to the boundary portion between the different kinds of materials for the course, the pattern can be blurred.

In addition, by providing on the base surface or material course a mat of nonwoven fabric, paper or other water or oil absorbing material, any excess amount of water, oil, lubricant-bonding agent, plasticizer or solvent can be supplied to any portion deficient in them to uniformly disperse them in the shaped article. As a result, the ratio of the water (auxiliary agents) in the surface to the cement (resins) becomes small and this means that the strength of the shaped article as a whole is enhanced. When an air permeable mat is used in the formation of an article under pressure, degassing is enhanced to obtain a dense article. By vibrating or pressing one or both of the material course and the backing course when the two layers are being allowed to set into an integral article, the integral article obtained becomes dense and is improved in strength. The article may be reinforced with long fibers, short fibers, wire nets or reinforcing rods by inserting these in or between the two layers. The method of using an article obtained by sheet making method or extrusion molding method or any of various plates or sheets as the backing course is applicable to the production of various articles including architectural panels and boards, wall sheets and tiles. The surface of an existing concrete article can be used as the base surface. In this case, the materials for the material course are discharged onto the concrete surface and set to be integral with the existing concrete article.

The present invention makes it possible to freely express line patterns of various widths from an extremely thin line to a bold line. In the case of a pattern of a person's signature in script, for example, the prior art methods are difficult to express an extremely thin line and can only produce a stiff pattern, whereas the method of the present invention can naturally express a pattern minutely. Therefore, a signature and the like as well as a script written with a writing brush can be adopted as a pattern to be expressed. Further, a pattern like a picture drawn with a single stroke of the brush can also be expressed neatly. Furthermore, a pattern like a venous pattern with lines tapered gradually can also be expressed. From a technical point of view, the method of the present invention makes it possible to express a line with the minimum width substantially the same as the diameter of the particles used. The present invention is thus able to easily produce sidewalk or pavement tiles patterned with maps, directions or the like, which have heretofore required much labor and money, thus enabling even a single article to be produced inexpensively.

Another effect of the present invention is that since the ground and pattern courses are both formed first, productivity is enhanced in the case of patterns each being small since the small patterns can be expressed by the straightforward operation of scraping the pattern particles, obviating the need for pattern-specific charging, and thereby greatly reducing the amount of charging work and the like that is required. Filling of the formed cavity with particles can be easily effected owing to their cave-in action by applying vibration to the particles or scraping up the particles. Even in the case of patterns each having a large area, since the configuration portion most important in expressing the patterns has been already filled with the particles due to their cave-in action, it suffices if the remaining cavity is filled with the particles, thus enabling the productivity to be made high and complicated patterns to be expressed. In the case of partial course formation, it is easy to change the color and kind of particles and it will suffice if an upper course is formed by an amount to be scraped without taking the shape into consideration, thus enhancing the productivity. In the case of entire course formation, the scraping operation can be effected freely and the amount of charging work is reduced, thereby enhancing the productivity. The productivity is further enhanced by using the scraper shown in FIG. 13 or the like and allowing the formed cavity to be filled with particles at a stroke due to their cave-in action by giving vibration to the particles to express a pattern.

As a further effect, the present invention enables scraping after formation of cavities in randomly blended particle courses, making it possible to produce patterns within a complex background. In the case of more than two randomly blended particle courses, it is possible to form complicatedly admixed patterns within a complex background due to the cave-in action of the particles. Also, in the case of centrifuged concrete, since a plurality of particle courses can be formed first and the particles are then scraped to produce the pattern, the pattern can be easily produced even when high-speed rotation is used. With this method a pattern can be easily produced on the surface of a circular cylinder etc.

Computer control can be used to produce patterns directly, achieve high production efficiency and freely modify patterns. By making it possible to control the angle and speed of the scraper etc., shaped articles having complex, sophisticated patterns can be produced.

These production methods make it possible to easily produce concrete shaped articles, artificial stone shaped articles, raw products for sintering into ceramic shaped articles, ceramic shaped articles, metal shaped articles, impasto shaped articles, plastic shaped articles and shaped foodstuffs including confectionery each having a pattern formed on part or all of the surface thereof. The good condition of the patterns of the patterned shape articles can therefore be maintained even when exposed to surface abrasion. Since the pattern layer is formed by a combination of various kinds of dry materials, the materials can, owing to their cave-in action, be densely charged without any gaps and the boundaries between adjacent materials can be finely expressed, resulting in clear-cut pattern formation.

What is claimed as new and desired to be secured by Letters Patent of the United States is:

1. A method of producing a patterned shaped article, the method comprising the steps of:

forming at least two superposed courses of different dry particles on a base surface;

moving a scraper located at a prescribed position above the base surface in accordance with a pattern to be expressed so as to scrape at least a lowermost course of said superposed courses, thereby forming a cavity in at least the lowermost course;

allowing the dry particle of an upper course of said superposed courses to cave into the cavity, thereby expressing the pattern on a bottom surface of the lowermost course; and allowing all the particles to set into an integral mass as they are.

2. A method of producing a patterned shaped article, the method comprising the steps of:

forming at least two superposed courses of different dry particles on a base surface;

moving a scraper located at a prescribed position above the base surface in accordance with a pattern to be expressed so as to scrape at least a lowermost course of said superposed courses, thereby forming a cavity in at least the lowermost course;

allowing the dry particles of an upper course of said superposed courses to cave into the cavity, thereby expressing the pattern on a bottom surface of the lowermost course;

making a top surface of the upper course even; and allowing all the particles to set into an integral mass.

3. A method of producing a patterned shaped article, the method comprising the steps of:

forming at least two superposed courses of different dry particles on a base surface;

moving a scraper located at a prescribed position above the base surface in accordance with a pattern to be expressed so as to scrape at least a lowermost course of said superposed courses, thereby forming a cavity in at least the lowermost course;

allowing the dry particles of an upper course of said superposed courses to cave into the cavity, thereby expressing the pattern on a bottom surface of the lowermost course;

overlaying a top surface of the upper course with a backing course; and allowing all the particles and the backing course to set into an integral mass.

4. A method of producing a patterned shaped article, the method comprising the steps of:

forming at least two superposed courses of different dry particles on a base surface;

moving a scraper located at a prescribed position above the base surface in accordance with a pattern to be expressed so as to scrape at least a lowermost course of said superposed courses while at the same time removing the particles of at least the lowermost course by suction, thereby forming a cavity in at least the lowermost course;

allowing the dry particles of an upper course of said superposed courses to cave into the cavity, thereby expressing the pattern on a bottom surface of the lowermost course; and allowing all the particles to set into an integral mass as they are.

5. A method of producing a patterned shaped article, the method comprising the steps of:

forming at least two superposed courses of different dry particles on a base surface;

moving a scraper located at a prescribed position above the base surface in accordance with a pattern to be expressed so as to scrape at least a lowermost course of said superposed courses while at the same time removing the particles of at least the lowermost course by suction, thereby forming a cavity in at least the lowermost course;

allowing the dry particles of an upper course of said superposed source to cave into the cavity, thereby expressing the pattern on a bottom surface of the lowermost course;

making a top surface of the upper course even; and allowing all the particles to set into an integral mass.

6. A method of producing a patterned shaped article, the method comprising the steps of:

forming at least two superposed courses of different dry particles on a base surface;

moving a scraper located at a prescribed position above the base surface in accordance with a pattern to be expressed so as to scrape at least a lowermost course of said superposed courses while at the same time removing the particles of at least the lowermost course by suction, thereby forming a cavity in at least the lowermost course;

allowing the dry particles of an upper course of said superposed courses to cave into the cavity, thereby expressing the pattern on a bottom surface of the lowermost course;

overlaying a top surface of the upper course with a backing course; and allowing all the particles and the backing course to set into an integral mass.

* * * * *

UNITED STATES PATENT AND TRADEMARK OFFICE
CERTIFICATE OF CORRECTION

PATENT NO. : 5,679,298
DATED : October 21, 1997
INVENTOR(S) : Hiroshi UCHIDA et al.

It is certified that error appears in the above-identified patent and that said Letters Patent is hereby corrected as shown below:

On the title page, Item [*], the Terminal Disclaimer should read:

-- The term of this patent shall not extend beyond the expiration date of Pat. No. 5,662,847 --

Signed and Sealed this

Twenty-third Day of December, 1997

Attest:

BRUCE LEHMAN

*Attesting Officer*     *Commissioner of Patents and Trademarks*